US008266529B2

(12) United States Patent
Ooi et al.

(10) Patent No.: US 8,266,529 B2
(45) Date of Patent: Sep. 11, 2012

(54) INFORMATION PROCESSING DEVICE AND DISPLAY INFORMATION EDITING METHOD OF INFORMATION PROCESSING DEVICE

(75) Inventors: Noriko Ooi, Tokyo (JP); Keiichi Murakami, Ichikawa (JP); Kentaro Endo, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 299 days.

(21) Appl. No.: 12/463,693

(22) Filed: May 11, 2009

(65) Prior Publication Data

US 2009/0287999 A1    Nov. 19, 2009

(30) Foreign Application Priority Data

May 13, 2008 (JP) .............................. P2008-126304

(51) Int. Cl.
*G06F 3/01* (2006.01)
*G06F 3/00* (2006.01)
(52) U.S. Cl. ........................................ 715/702; 715/709
(58) Field of Classification Search .................. 715/702, 715/709
See application file for complete search history.

(56) References Cited

U.S. PATENT DOCUMENTS

| 7,002,557 | B2 * | 2/2006 | Iizuka et al. | 345/173 |
|---|---|---|---|---|
| 7,663,607 | B2 * | 2/2010 | Hotelling et al. | 345/173 |
| 7,667,692 | B2 * | 2/2010 | Marcus et al. | 345/169 |
| 7,705,799 | B2 * | 4/2010 | Niwa | 345/1.1 |
| 7,770,136 | B2 * | 8/2010 | Beeck et al. | 715/863 |
| 7,883,460 | B2 * | 2/2011 | Uchimura et al. | 600/146 |
| 2004/0150668 | A1 | 8/2004 | Myers et al. | |
| 2005/0264540 | A1 * | 12/2005 | Niwa | 345/173 |
| 2006/0097991 | A1 * | 5/2006 | Hotelling et al. | 345/173 |
| 2006/0110203 | A1 * | 5/2006 | Grafton | 400/489 |
| 2007/0229474 | A1 * | 10/2007 | Okabayashi | 345/173 |
| 2007/0257890 | A1 * | 11/2007 | Hotelling et al. | 345/173 |
| 2008/0309632 | A1 * | 12/2008 | Westerman et al. | 345/173 |
| 2009/0138800 | A1 * | 5/2009 | Anderson et al. | 715/702 |
| 2011/0055703 | A1 * | 3/2011 | Lundback et al. | 715/727 |
| 2011/0057907 | A1 * | 3/2011 | Kim et al. | 345/175 |
| 2011/0060986 | A1 * | 3/2011 | Yang | 715/702 |
| 2011/0141043 | A1 * | 6/2011 | Soubrie | 345/173 |

FOREIGN PATENT DOCUMENTS

| AU | 2007100826 | 9/2007 |
|---|---|---|
| EP | 0 622 722 | 11/1994 |
| JP | 6-289984 | 10/1994 |

(Continued)

OTHER PUBLICATIONS

Office Action issued Dec. 23, 2010, in Korean Patent Application No. 10-2009-0041764 (with English translation).

(Continued)

*Primary Examiner* — William Bashore
*Assistant Examiner* — David Phantana Angkool
(74) *Attorney, Agent, or Firm* — Oblon, Spivak, McClelland, Maier & Neustadt, L.L.P.

(57) ABSTRACT

An information processing device of an aspect of the invention has display means having a display region; operation means, having a contact region, for outputting a position signal indicating the position of a contact operation in the contact region; range decision means for deciding a target range of the display region based on the position signals for two points from the operation means; processing menu display means for causing the display means to display a processing menu at a position corresponding to the target range of the display region; processing decision means for deciding the processing of the processing menu corresponding to the position of the contact operation in the contact region; and processing execution means for executing the processing on the target range of the display region.

11 Claims, 25 Drawing Sheets

FOREIGN PATENT DOCUMENTS

| | | |
|---|---|---|
| JP | 2000-163031 | 6/2000 |
| JP | 2000-311040 | 11/2000 |
| KR | 10-0672605 B1 | 1/2007 |
| KR | 10-0783553 | 12/2007 |

OTHER PUBLICATIONS

Office Action issued Apr. 17, 2012, in Japanese Patent Application No. 2008-126304 filed May 13, 2008 (with English-language Translation).

Rekimoto, Jun, "SmartSkin: An Infrastructure for Freehand Manipulation on Interactive Surfaces", CHI Conference on Human Factors in Computers, Minneapolis, Minnesota, Apr. 20-25, 2002, CHI 2002 Conference Proceedings, pp. 113-120; XP-001099406.

European Search Report issued on Jun. 1, 2012, in counterpart European Application No. 09 15 9997 (7 pages).

Office Action issued Sep. 30, 2011, in Korean Patent Application No. 10-2009-0041764 with English translation.

* cited by examiner

Fig.14

| | | CONTACT AREA (mm²) | | | | PRESSURE INTENSITY (mmHg) | | | |
|---|---|---|---|---|---|---|---|---|---|
| | | MINIMUM | MAXIMUM | AVERAGE | ERROR CORRECTION | MINIMUM | MAXIMUM | AVERAGE | ERROR CORRECTION |
| LEFT HAND | THUM | 350 | 600 | 475 | ±125 | 30 | 80 | 55 | ±25 |
| | INDEX FINGER | 250 | 500 | 375 | ±125 | 25 | 70 | 48 | ±22 |
| | MIDDLE FINGER | 200 | 400 | 300 | ±100 | 20 | 60 | 40 | ±20 |
| | RING FINGER | 150 | 300 | 225 | ±75 | 10 | 50 | 30 | ±20 |
| | LITTLE FINGER | 100 | 200 | 150 | ±50 | 5 | 40 | 23 | ±17 |
| | PALM | 400 | 800 | 600 | ±200 | 50 | 90 | 70 | ±20 |
| RIGHT HAND | THUM | 350 | 600 | 475 | ±125 | 40 | 90 | 65 | ±35 |
| | INDEX FINGER | 250 | 500 | 375 | ±125 | 35 | 80 | 55 | ±25 |
| | MIDDLE FINGER | 200 | 400 | 300 | ±100 | 25 | 70 | 48 | ±22 |
| | RING FINGER | 150 | 300 | 225 | ±75 | 15 | 60 | 38 | ±22 |
| | LITTLE FINGER | 100 | 200 | 150 | ±50 | 10 | 50 | 30 | ±20 |
| | PALM | 400 | 800 | 600 | ±200 | 60 | 100 | 80 | ±20 |

| | | |
|---|---|---|
| PRESSURE 48 | | |
| | PRESSURE 55 | |
| | | |

(b)

| | | |
|---|---|---|
| | | |
| | PRESSURE 55 | |
| PRESSURE 48 | | |

INFORMATION PROCESSING DEVICE AND DISPLAY INFORMATION EDITING METHOD OF INFORMATION PROCESSING DEVICE

BACKGROUND OF THE INVENTION

1. Field of the Invention

This invention relates to an information processing device, and to a display information editing method of such an information processing device.

2. Related Background Art

Portable telephone terminals, PDAs (Personal Digital Assistants), and other information processing devices comprise a keyboard, mouse, operation buttons, or other operation portions, and a display or other display portion, and can perform text/image information processing in which text information is displayed on a display portion according to information input by an operation portion, or text information and image information or similar, stored in advance, are displayed on a display portion according to operation by an operation portion.

In Japanese Patent Application Laid-open No. 2000-311040, an information processing device of this type is described. This information processing device can be used to specify a display information range by operating a cursor on the display portion by means of a mouse, and then, with the cursor within the specified range, performing a clicking operation with the mouse to perform copying of the display information. Using this information processing device, only a range specification operation and a single click operation are performed, and the user need only move the mouse slightly between these two operations, so that the ease of operation of display information copying can be improved. Further, in Japanese Patent Application Laid-open No. 2000-311040, the possibility of application of a touch panel as the operation portion of the information processing device is described.

However, in addition to copying, there are demands that an information processing device have various other editing functions, such as for enlargement/reduction and color modification. However, the information processing device described in Japanese Patent Application Laid-open No. 2000-311040 can perform only copying, and cannot satisfy such demands.

SUMMARY OF THE INVENTION

Hence an object of this invention is to provide an information processing device and a display information editing method of an information processing device enabling improved ease of operation for a plurality of display information editing functions.

An information processing device of this invention comprises (a) display means for displaying information; (b) operation means, having a contact region corresponding to a display region of the display means, for detecting a contact operation in the contact region and outputting a position signal indicating the position of the contact operation in the contact region; (c) range decision means for deciding a target range of the display region, based on position signals for two points from the operation means; (d) processing menu display means for causing the display means to display a processing menu for selection of various processing, at a position corresponding to the target range of the display region decided by the range decision means; (e) processing decision means for deciding processing of the processing menu corresponding to the position of contact operation in the contact region, based on the position signal for a third point from the operation means; and (f) processing execution means for executing the processing decided by the processing decision means on the target range of the display region decided by the range decision means.

A display information editing method of an information processing device of this invention is a display information editing method of an information processing device which has display means for displaying information and operation means having a contact region corresponding to a display region of the display means, in which (a) a contact operation in the contact region is detected, and a position signal corresponding to the position of the contact operation in the contact region is generated; (b) a target range of the display region is decided based on the position signals for two points; (c) the display means is caused to display a processing menu for selection of various processing, at a position corresponding to the decided target range of the display region; (d) processing of the processing menu corresponding to the position of contact operation in the contact region is decided, based on the position signal for a third point; and (e) the decided processing is executed on the decided target range of the display region.

By means of this information processing device and display information editing method of an information processing device, processing menu display means causes display means to display a processing menu at a position corresponding to a display region target range decided by range decision means in order to select various processing, so that the user need only perform a range specification operation using two fingers and a processing specification operation using a third finger. Hence the ease of operation of a plurality of display information editing functions can be improved.

It is preferable that the above-described processing menu display means cause the display means to display the processing menu at a position set in advance for the target range of the display region.

The ease of operation is different for the right hand and for the left hand. And, the ease of operation is different depending on the two fingers used for range specification and the third finger used for processing specification. For example, when using the little finger and index finger of the left hand to perform range specification, and the thumb of the left hand to perform processing specification, it is preferable that the processing menu be displayed in the center of the portion below the specified range, or displayed to the right thereof. And, when using the little finger and thumb of the right hand to perform range specification, and the index finger of the right hand to perform processing specification, it is preferable that the processing menu M be displayed in the center of the portion above the specified range. By this means, the display position of the processing menu corresponding to the target range of the display region can be set in advance according to user preferences, so that ease of operation can be further improved. And, the user can perform operations with one hand, so that ease of operation can be improved.

It is preferable that the above-described information processing device further comprise identification means for identifying whether a hand performing the contact operation in the contact region is the right hand or the left hand, and for identifying two fingers of the contact operation, and that the above-described processing menu display means cause the display means to display the processing menu at a position relative to the target range of the display region associated with the combination of the hand and the two fingers, based on the hand and the two fingers identified by the identification means.

By this means, whether range specification was performed by the right hand or the left hand is identified by the identification means, and the two fingers of the range specification are identified; for example, when range specification is performed by the little finger and index finger of the left hand, by displaying the processing menu on the right side of the portion below the specified range, the ease of operation by the thumb of the right hand can be improved. And, when for example range specification is performed by the little finger and thumb of the right hand, by displaying the processing menu in the center of the portion above the specified range, ease of operation by the index finger of the right hand can be improved. Hence ease of operation can be improved without depending on the hand and fingers used for contact operations. Also, a user can perform operations with one hand, so that ease of operation can be further improved.

It is preferable that when the position of the contact operation indicated by the position signals for two points from the operation means changes, the above-described range decision means re-decides the target range of the display region.

By this means, a specified range can be adjusted by sliding movement of the two fingers used in range specification, so that ease of operation can be further improved.

It is preferable that the above-described range decision means decide the target range of the display region only when position signals for two points are received simultaneously from the operation means.

By this means, for example, an information input operation due to single-point contact and a range specification operation due to simultaneous two-point contact can be discriminated, so that display information editing can be caused to be performed even during an information input operation.

By means of this invention, the ease of operation of an information processing device with respect to a plurality of display information editing functions can be improved.

BRIEF DESCRIPTION OF THE DRAWINGS

FIG. 14 shows a table in which the pressure intensities and contact areas of the fingers of the right and left hands are associated with the fingers of the hands;

FIG. 15 shows the positional relationship of contact operations;

DESCRIPTION OF THE PREFERRED EMBODIMENTS

Figure 1:
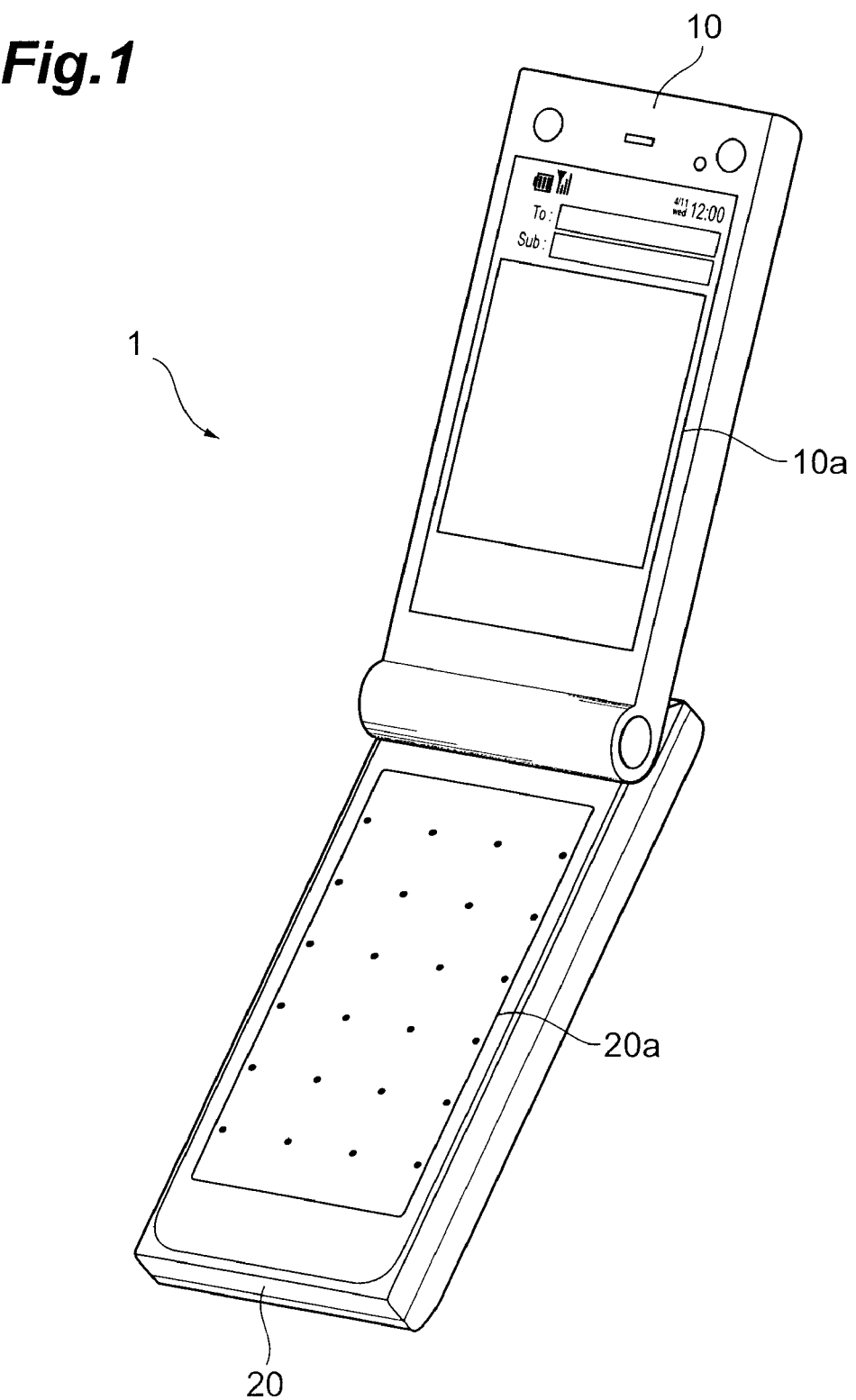
FIG. 1 is a perspective view showing the configuration of the information processing device of a first aspect of the invention.

Below, preferred aspects of the invention are explained in detail, referring to the drawings. In the figures, portions which are the same or equivalent are assigned the same symbols.
(First Aspect)

Figure 2:
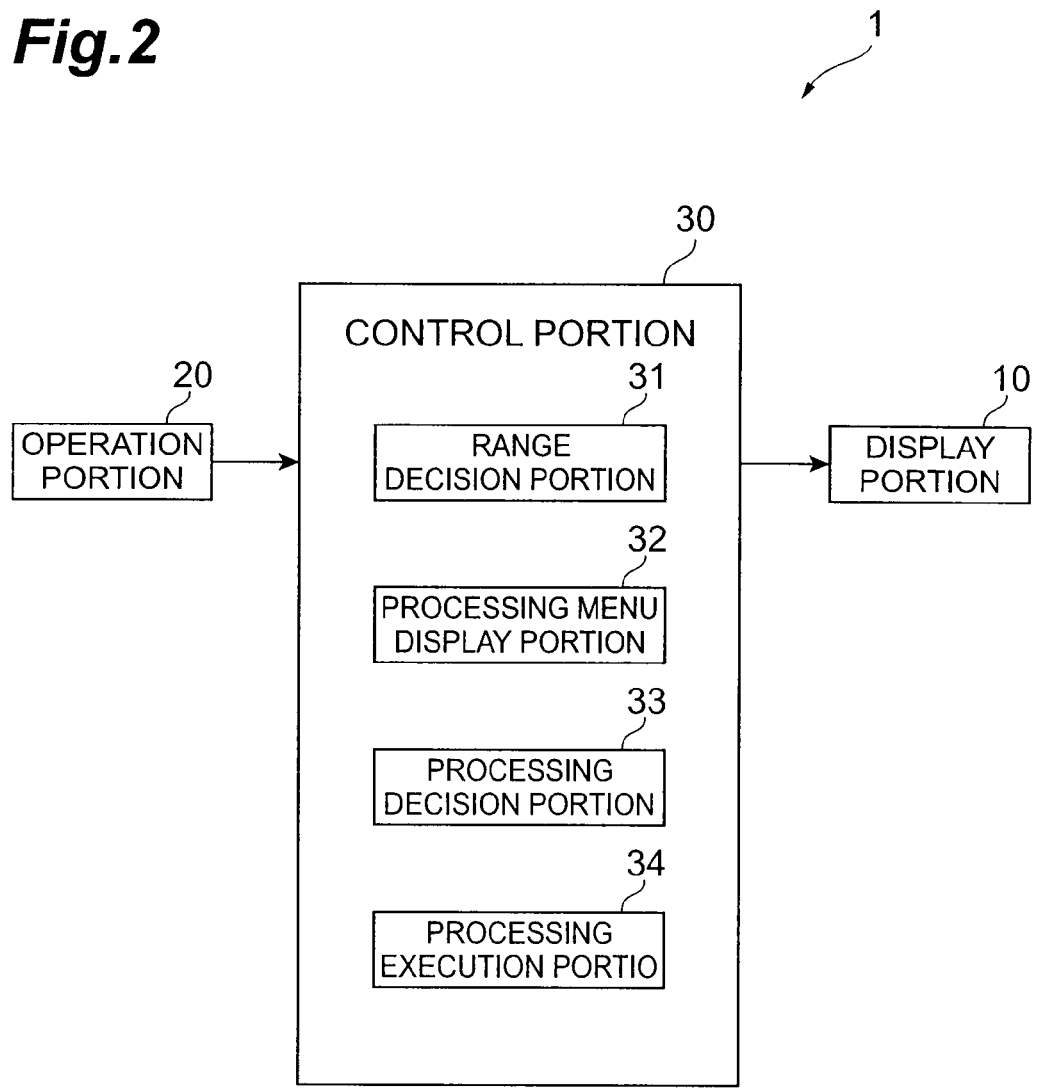
FIG. 2 is a block diagram showing the configuration of the information processing device of the first aspect of the invention.

FIG. 1 is a perspective view showing the configuration of the information processing device of a first aspect of the invention, and FIG. 2 is a block diagram showing the configuration of the information processing device of the first aspect of the invention. A portable telephone terminal is shown as an example of an information processing device in FIG. 1 and FIG. 2. The information processing device 1 of FIG. 1 and FIG. 2 comprises a display portion 10, operation portion 20, and control portion 30. In FIG. 1, the control portion 30 is accommodated within a housing which accommodates the display portion 10, or within a housing which accommodates the operation portion 20.

The display portion 10 is for example a liquid crystal display. A plurality of pixels are arranged in row and column directions in the display portion 10, and the region in which these pixels are arranged is the display region 10a. The display portion 10 receives text data, image data, and other information from the control portion 30, and displays this information in the display region 10a. For example, based on information from the control portion 30, the display portion 10 causes pixels corresponding to the row and column coordinates (addresses) representing this information to emit light in colors representing the information.

The operation portion 20 is for example an electrostatic pad, having a column electrode layer, row electrode layer, and a dielectric layer arranged between the column electrode layer and the row electrode layer. In the column electrode layer, a plurality of column electrodes are arranged in parallel in the row direction extending in the column direction, and in the row electrode layer, a plurality of row electrodes are arranged in parallel in the column direction extending in the row direction. The region in which these column electrodes and row electrodes are arranged is the contact region 20a. The operation portion 20 detects contact operations in the contact region 20a by the user, and outputs position signals to the control portion 30 indicating the positions of contact operations in the contact region 20a.

Specifically, in the operation portion 20, portions at which column electrodes and row electrodes intersect each comprise a capacitor, and through the change in the electrostatic capacitance of each capacitor due to a contact operation by the user, the potentials on the column electrodes and row electrodes of the capacitors change. In this way, the operation portion 20 detects changes in the electrostatic capacitances of capacitors, that is, changes in the potentials of column electrodes and row electrodes, and detects contact operations by the user on the contact region 20a. And, the operation portion 20 outputs to the control portion 30, as position signals, the row and column coordinates of portions of intersection of the column electrodes and row electrodes the potentials of which have changed.

The positions of intersection of column coordinates and row coordinates in the contact region 20a of the operation portion 20 are associated with pixel positions in the display region 10a of the display portion 10. The positions of intersection of row electrodes and column electrodes, and the positions of pixels, need not necessarily be associated in a one-to-one relationship.

The control portion 30 has ROM (Read-Only Memory), which stores various programs and various information (transmission/reception mail log character information, image information, mail address information, and similar), a CPU (Central Processing Unit) which executes various program stored in the ROM, and RAM (Random Access Memory) which temporarily stores information, or is used as a working area for execution of various programs. By means of this configuration, the control portion 30 functions as a range decision portion 31, processing menu display portion 32, processing decision portion 33, and processing execution portion 34.

Figure 3:
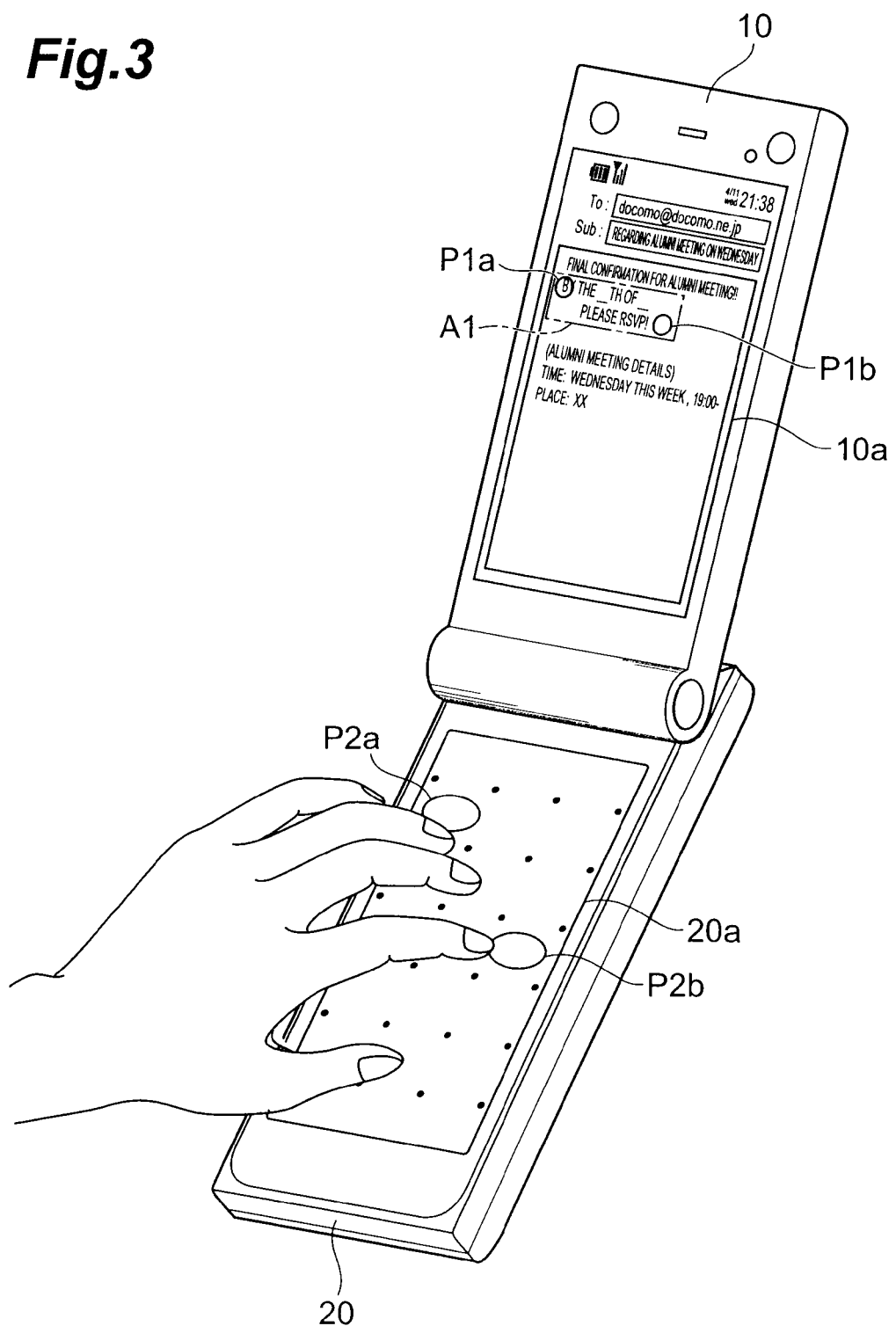
FIG. 3 shows range decision processing by the range decision portion of FIG. 2.
Figure 4:
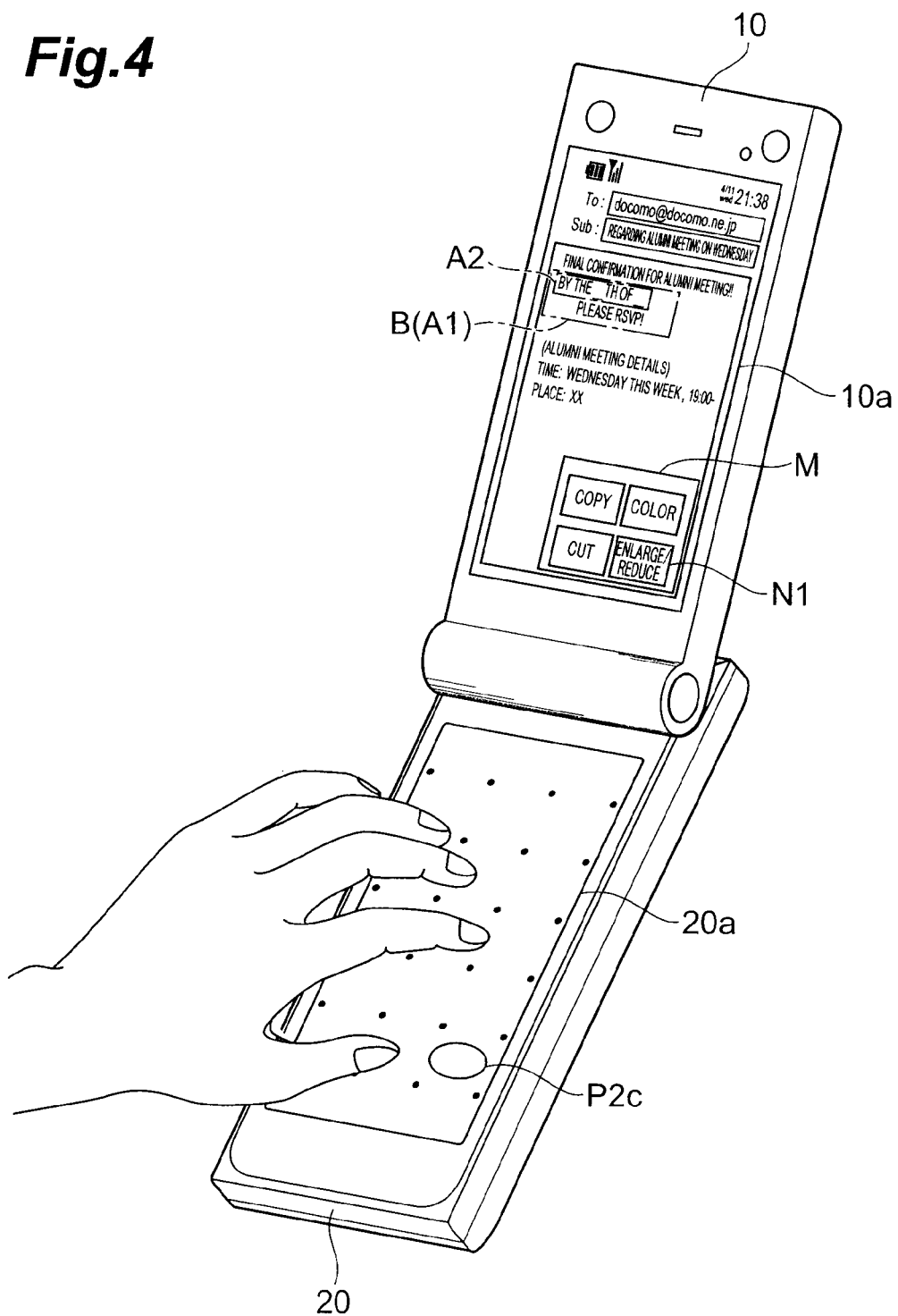
FIG. 4 shows processing menu display processing by the processing menu display portion, range adjustment processing by the range decision portion, and editing processing decision processing by the processing decision portion of FIG. 2.
Figure 5:
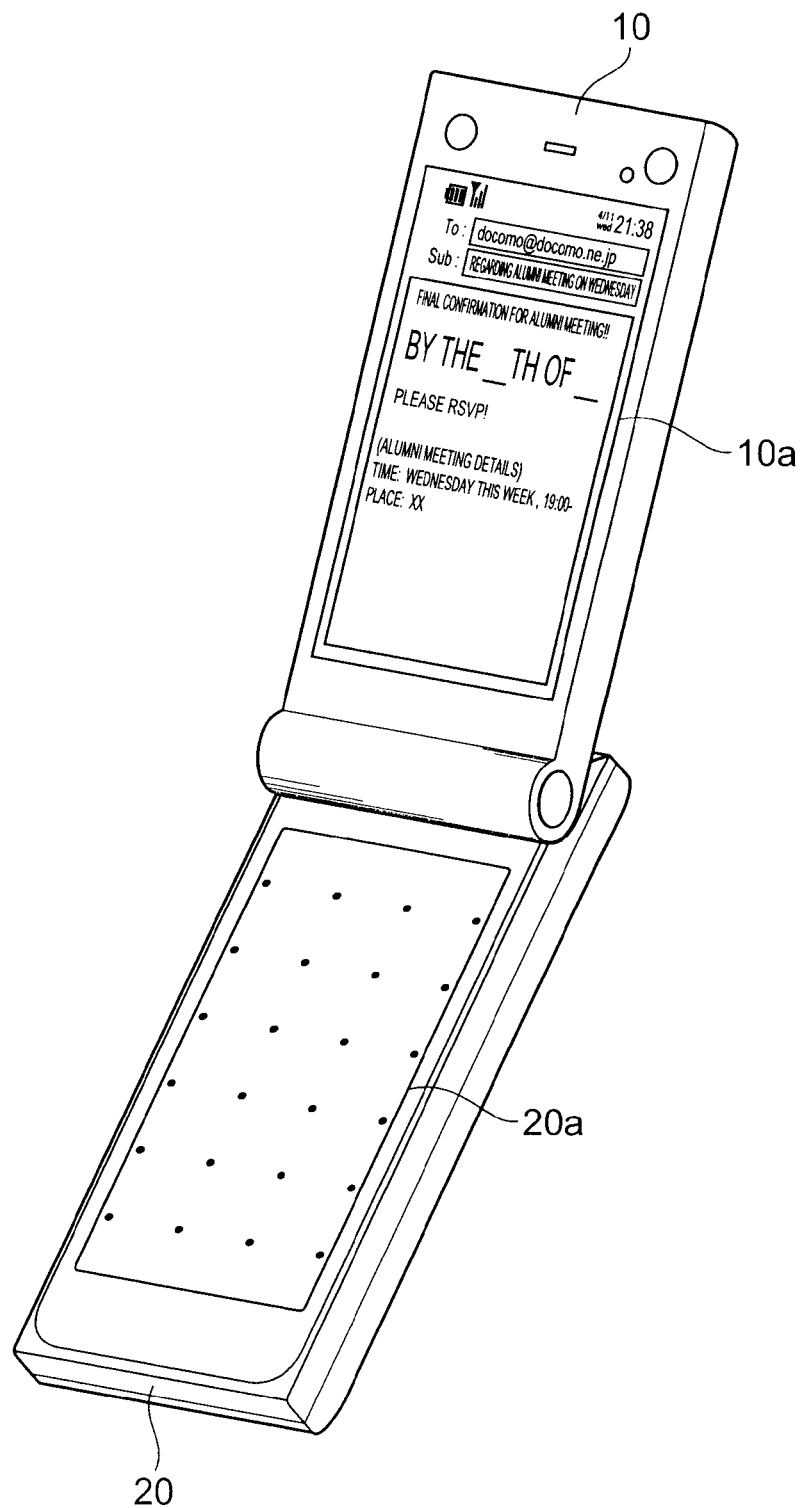
FIG. 5 shows editing processing execution processing by the processing execution portion of FIG. 2.

Below, the range decision portion 31, processing menu display portion 32, processing decision portion 33, and processing execution portion 34 are explained using FIG. 3 to FIG. 5. FIG. 3 to FIG. 5 show in sequence the processing processes of range decision processing and range adjustment processing by the range decision portion 31, processing menu display processing by the processing menu display portion 32, editing processing decision processing by the processing decision portion 33, and editing processing execution processing by the processing execution portion 34.

The range decision portion 31 decides the target range A1 of the display region 10a based on position signals for two points from the operation portion 20. In this aspect, the range decision portion 31 decides the target range A1 of the display region 10a which takes as the starting point and ending point the two positions P1a, P1b respectively of the display region 10a corresponding to the two positions P2a, P2b of the contact operation in the contact region 20a.

For example, in the ROM, the positions of intersection of column electrodes and row electrodes in the contact region 20a of the operation portion 20 and pixels in the display region 10a of the display portion 10 are stored in advance in association as a table. Based on this table, the range decision portion 31 determines the two positions P1a, P1b of the display region 10a corresponding to the two positions P2a, P2b of the contact operation in the contact region 20a. And, the range decision portion 31 decides, as the target range A1 of the display region 10a, the range which takes the two positions P1a, P1b of the display region 10a thus determined as the starting point and ending point respectively.

The range decision portion 31 performs adjustment of the decided target range A1. For example, the range decision portion 31 causes the display portion 10 to display the border B indicating the target range A1 after target range decision, as shown in FIG. 4, and the operation portion 20 detects contact operations and sliding in the portion of the contact region 20a corresponding to this border B. The range decision portion 31 receives position signals corresponding to sliding, and again determines the target range. And, the range decision portion 31 re-decides the range determined again as the target range A2 when a processing specification operation, described below, is performed. Specifically, as explained below, the range decision portion 31 finalizes the target range A2 when the position N2 of the contact region 20a corresponding to the positions of the processing N1 of the processing menu M in the display region 10a is selected.

The processing menu display portion 32 causes the display portion 10 to display the processing menu M to enable selection of various processing. For example, display positions for the processing menu M corresponding to target ranges A1 of the display region 10a are stored in advance in the ROM. The display position of the processing menu M can be set by the user, for example during initial settings or at other times. In this aspect, range specification is performed with the little finger and the index finger of the left hand, and each time the thumb is used to perform processing specification, the display position of the processing menu M is set on the right side in the portion below the target range A1.

The processing decision portion 33 decides the processing N1 in the processing menu M corresponding to the position P2c of the contact operation in the contact region 20a, based on the position signal for a third point from the operation portion 20.

The processing execution portion 34 executes the processing N1 decided by the processing decision portion 33 on the target range A2 of the display region 10a decided by the range decision portion 31. In this aspect, the processing execution portion 34 performs enlargement editing of the characters displayed in the target range A2, as shown in FIG. 5.

Figure 6:
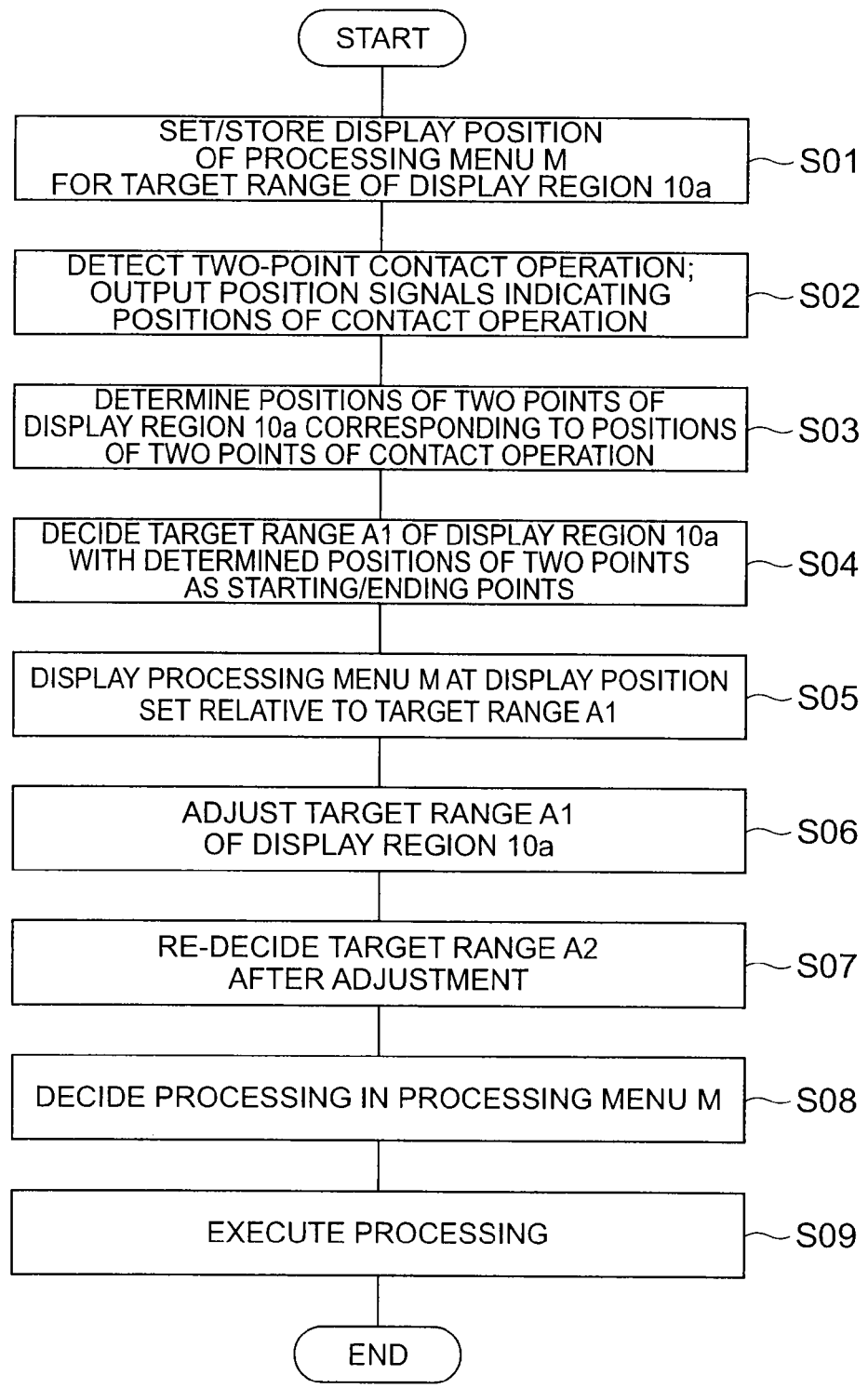
FIG. 6 is a flowchart showing the display information editing method of the information processing device of the first aspect of the invention.

Next, operation of the information processing device 1 of the first aspect is explained, and the display information editing method of the information processing device of the first aspect of the invention is explained. FIG. 6 is a flowchart showing the display information editing method of the information processing device of the first aspect of the invention.

First, the display position of the processing menu M relative to the target range of the display region 10a is set by the user. In this aspect, the information processing device 1, in response to a command input by the user, sets the display position of the processing menu M on the right side of the portion below the target range, and stores the display position thus set for the processing menu M in ROM as for example coordinate data (step S01).

Then, as shown in FIG. 3, when the user touches the two points P2a, P2b with the little finger and index finger, the operation portion 20 detects changes in the potentials of the column electrodes and row electrodes due to the contact of the fingers with the contact region 20a, and outputs to the control portion 30, as position signals, the column and row coordinates of the intersecting portions of the column electrodes and row electrodes for which potentials have changed (step S02).

Next, the range decision portion 31 determines the two positions P1a, P1b of the display region 10a corresponding to the two positions P2a, P2b of the contact operation in the contact region 20a, based on the table stored in advance in ROM (step S03).

Next, the range decision portion 31 decides the target range A1 of the display region 10a having as the starting point and ending point the previously determined two positions P1a, P1b, respectively, of the display region 10a (step S04).

Next, as shown in FIG. 4, the processing menu display portion 32 causes the processing menu M to be displayed at the display position of the processing menu M corresponding to the target range A1 of the display region 10a, stored in advance in ROM. In this aspect, the processing menu display portion 32 causes display of the processing menu M on the right side in the portion below the target range A1 (step S03).

Next, the range decision portion 31 causes the display portion 10 to display, using a border B, the target range A1 of the display region 10a. When the user touches the portion of the contact region 20a of the operation portion 20 corresponding to the border B of the display region 10a of the display portion 10, and slides his fingers, the operation portion 20 detects the finger sliding operation. The range decision portion 31 receives position signals corresponding to the sliding operation, and re-determines the target range of the display region 10a. In this way, the range decision portion 31 adjusts the target range A1 of the display region 10a (step S06).

Thereafter, upon receiving the position signal for a third point from the operation portion 20, the range decision portion 31 re-decides the range of the display region 10a after adjustment as the target range A2 (step S07).

Based on the position signal for the third point from the operation portion 20, the processing decision portion 33 decides on the processing "enlarge/reduce" N1 in the processing menu M corresponding to the position P2c of the contact operation in the contact region 20a (step S08).

Next, the processing execution portion 34 executes the processing N1, decided on by the processing decision portion 33, on the target range A2 of the display region 10a decided by the range decision portion 31. In this aspect, the processing execution portion 34 performs enlargement processing of the characters displayed in the target range A2, as shown in FIG. 5 (step S09).

In this way, by means of the display processing device 1 of the first aspect and the display information editing method of an information processing device of the first aspect, the processing menu display portion 32 causes the display portion 10 to display a processing menu M for selection of various processing functions at a position corresponding to the target range A1 of the display region 10a, decided by the range decision portion 31, and so the user need only perform a range specification operation using two fingers and a processing specification operation using a third finger. Hence the ease of operation with respect to a plurality of display information editing functions can be improved.

However, ease of operation differs for the right and for the left hands. And, ease of operation is also different depending on differences in the two fingers used for range specification and the third finger used for processing specification. When, as in this aspect, range specification is performed using the little finger and index finger of the left hand, and processing specification is performed using the thumb of the left hand, it is preferable that the processing menu be displayed in the center or towards the right in the portion below the specified range.

By means of the information processing device 1 of the first aspect and the display information editing method of an information processing device of the first aspect, the display position of the processing menu M can be set in advance according to user preferences, so that ease of operation can be further improved. Also, the user can perform operations using one hand, so that ease of operation can be further improved.

And, by means of the information processing device 1 of the first aspect and the display information editing method of an information processing device of the first aspect, when the positions of a contact operation indicated by the position signals for two points from the operation portion 20 have changed, the target range A2 of the display region 10a can be re-decided by the range decision portion 31, so that by sliding and moving the two fingers used for range specification, the specified range can be adjusted, and so ease of operation can be further improved.

(Second Aspect)

Figure 7:
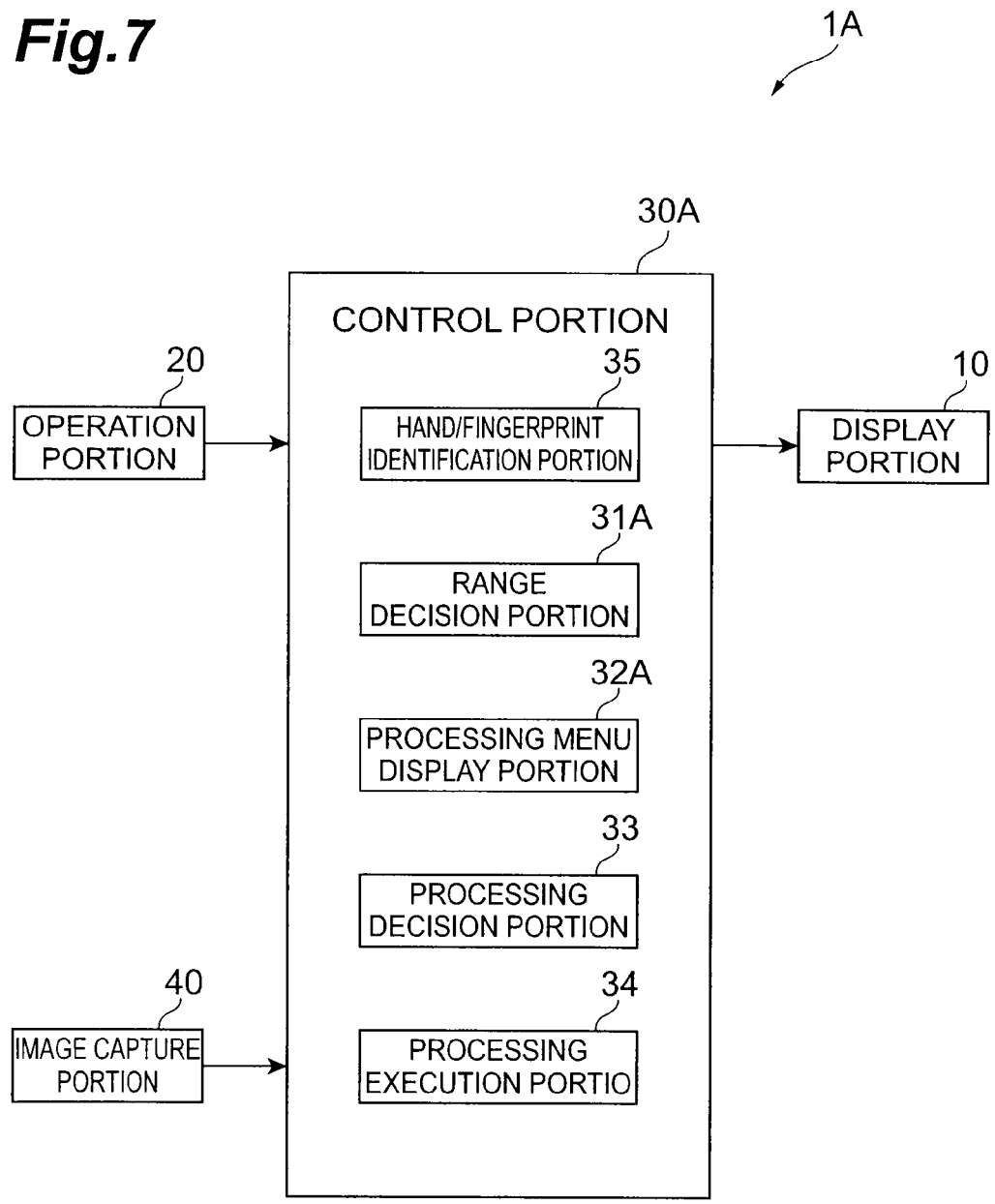
FIG. 7 is a block diagram showing the configuration of the information processing device of a second aspect of the invention.

FIG. 7 is a block diagram showing the configuration of the information processing device of a second aspect of the invention. The configuration of the information processing device 1A shown in FIG. 7 differs from that of the first aspect in further comprising an image capture portion 40 in the information processing device 1, and in comprising, in place of the control portion 30, a control portion 30A. Otherwise the configuration of the information processing device 1A is the same as that of the information processing device 1.

The image capture portion 40 is for example a camera, which captures images of the hand and fingers of the user performing contact operations in the contact portion 20, and outputs captured image signals to the control portion 30A.

The control portion 30A differs from the configuration in the first aspect in further having a hand/finger identification portion 35 in the control portion 30, and in having, in place of the range decision portion 31 and processing menu display portion 32, a range decision portion 31A and processing menu display portion 32A. Otherwise the configuration of the control portion 30A is the same as that of the control portion 30.

Figure 8:
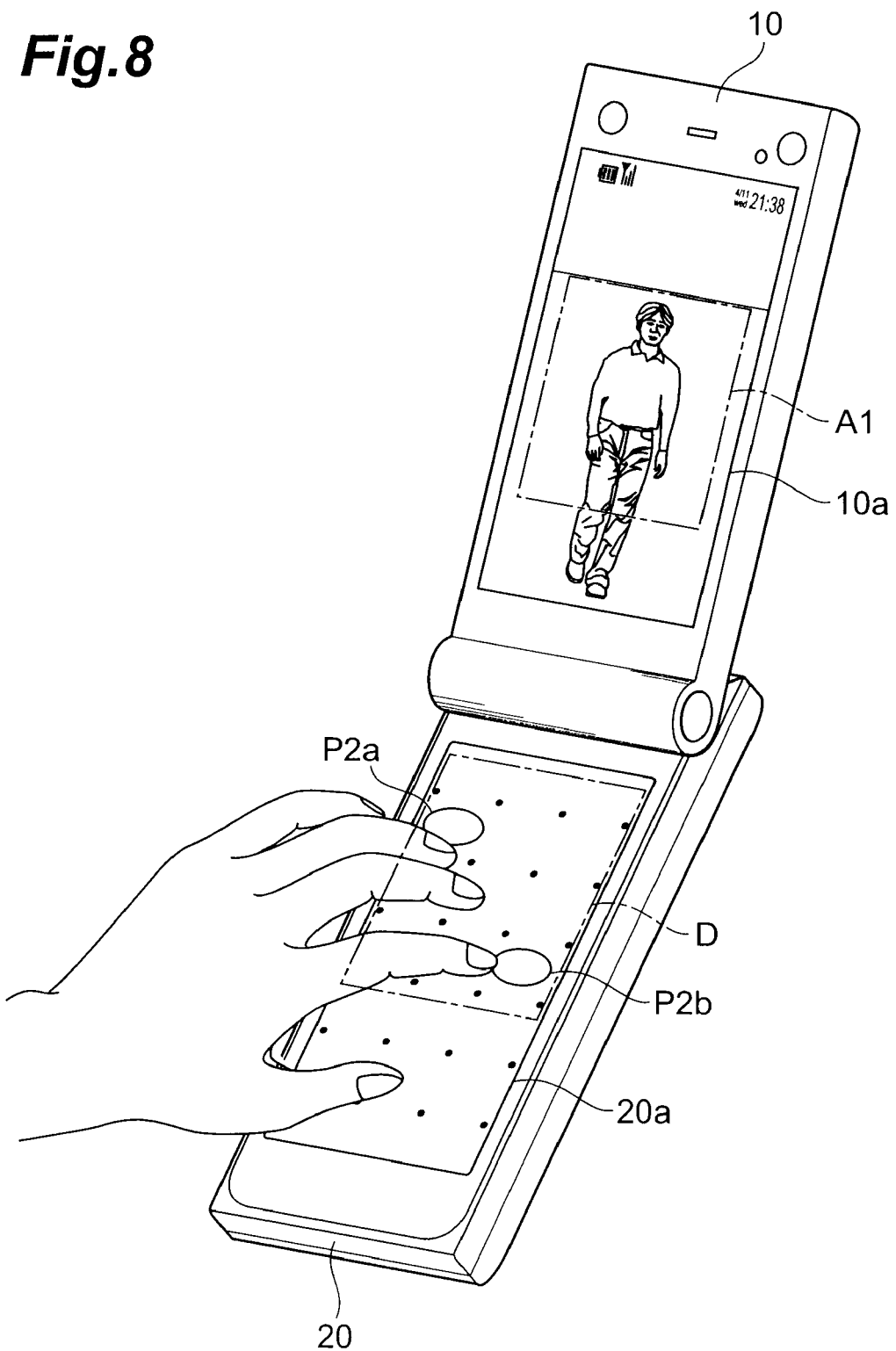
FIG. 8 shows the range decision processing of the range decision portion of FIG. 2.
Figure 9:
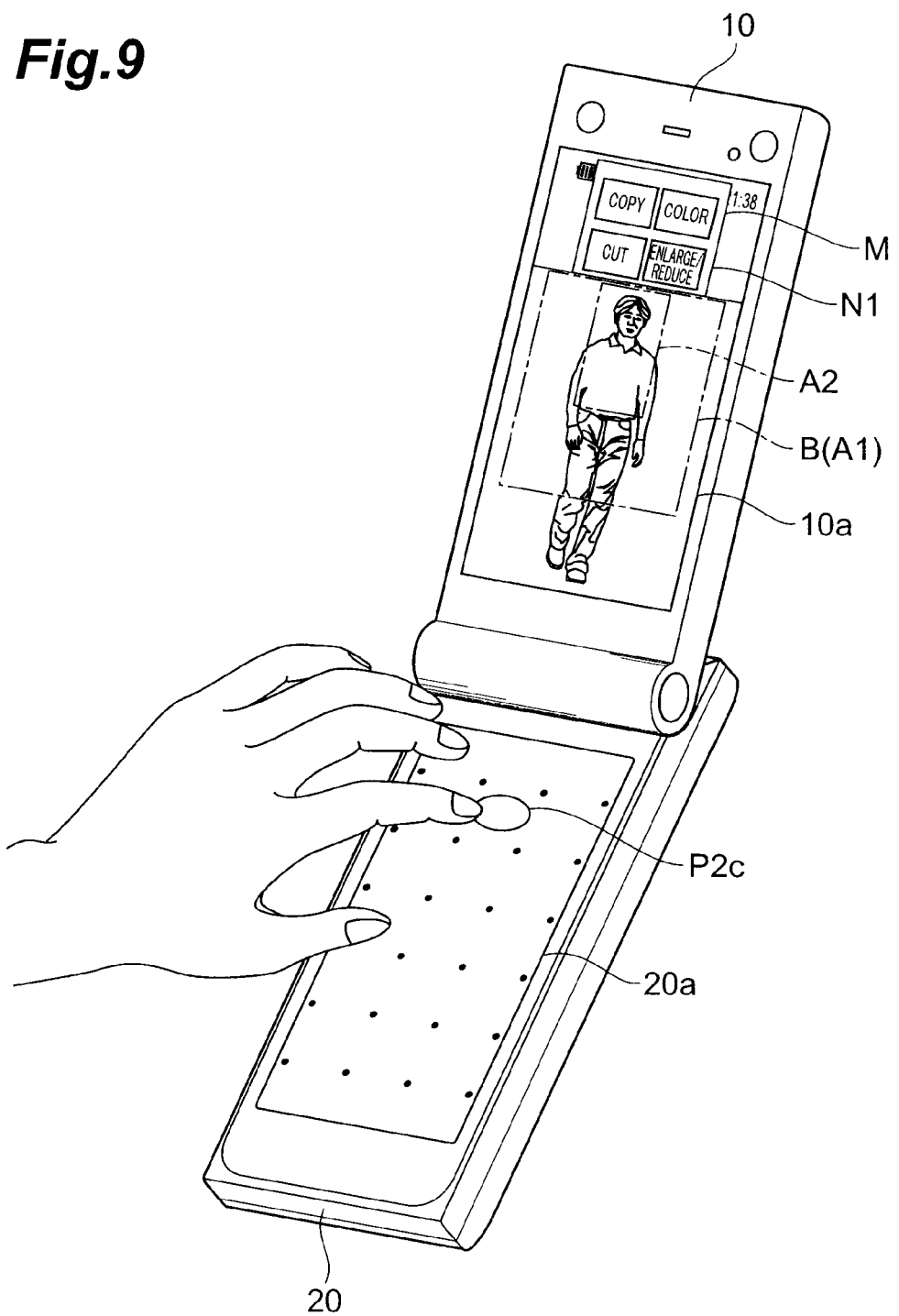
FIG. 9 shows the processing menu display processing of the processing menu display portion, the range adjustment processing of the range decision portion, and the editing processing decision processing of the processing decision portion of FIG. 2.
Figure 10:
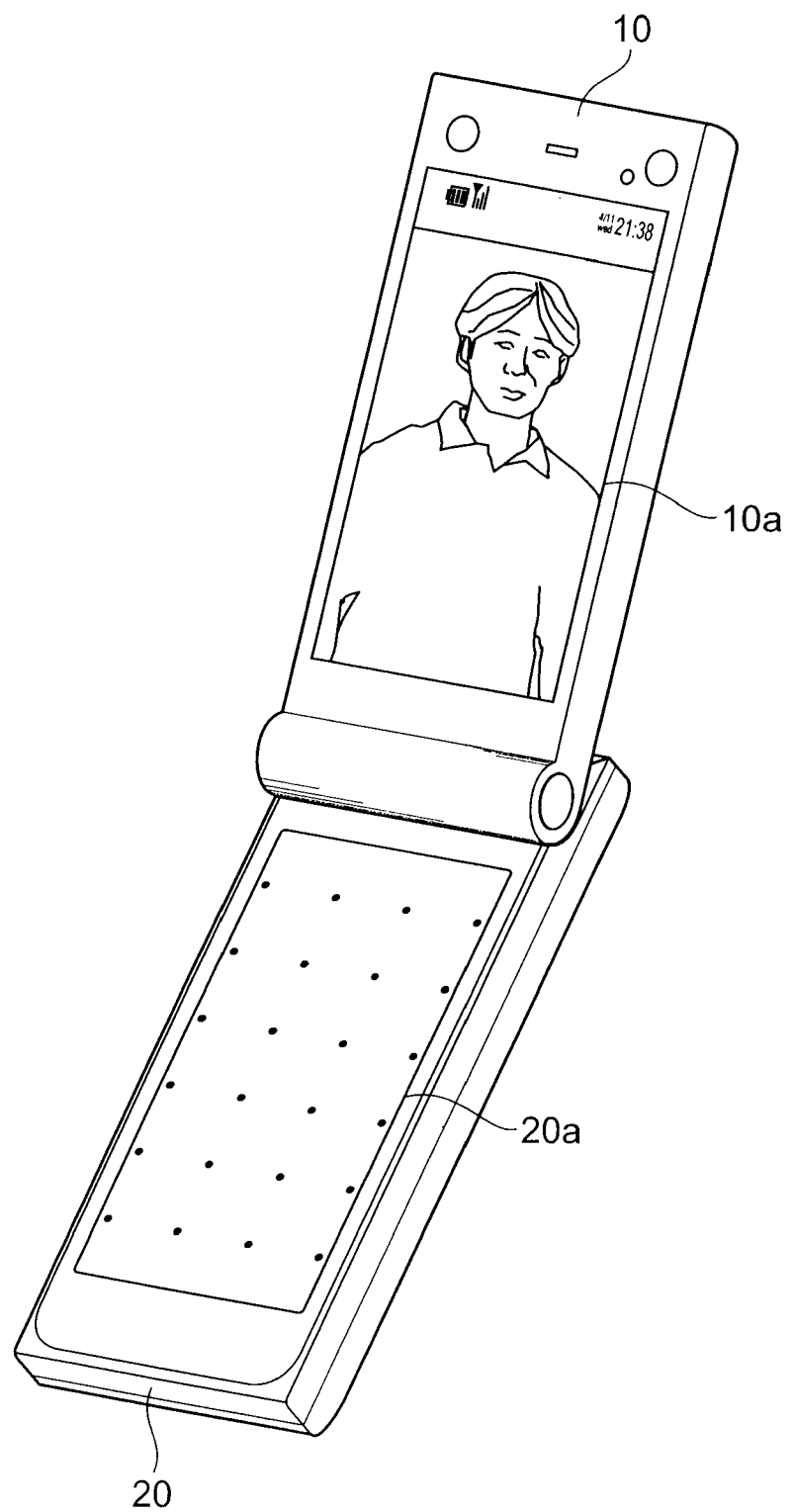
FIG. 10 shows the editing processing execution processing of the processing execution portion of FIG. 2.

Below, the hand/finger identification portion 35, range decision portion 31A, and processing menu display portion 32A are explained using FIG. 8 to FIG. 10. FIG. 8 to FIG. 10 show in sequence the processing processes of range decision processing and range adjustment processing by the range decision portion 31A, processing menu display processing by the processing menu display portion 32A, editing processing decision processing by the above-described processing decision portion 33, and editing processing execution processing by the above-described processing execution portion 34.

The hand/finger identification portion 35 identifies the hand and the two fingers performing the contact operation in the contact region 20a. For example, by performing image processing of image signals from the image capture portion 40, the hand/finger identification portion 35 identifies the hand of the contact operation as the right hand or the left hand, and identifies the two fingers of the contact operation among the thumb, index finger, middle finger, ring finger, and little finger.

As shown in FIG. 8, the range decision portion 31A differs from the range decision portion 31 in deciding the contact operation range D of the contact region 20a having as starting and ending points the two positions P2a, P2b respectively of the contact operation, based on the position signals for two points from the operation portion 20, and thereafter, deciding the target range A1 of the display region 10a corresponding to the contact operation range D of the contact region 20a.

For example, contact operation ranges D are stored in advance in ROM in a plurality of conceivable patterns in the contact region 20a of the operation portion 20, and a plurality of patterns of target ranges A1 in the display region 10a of the display portion 10 associated with the respective contact operation ranges D are stored in advance in ROM. That is, a plurality of patterns of contact operation ranges D and a plurality of patterns of target ranges A1 are stored in advance in association, as a table, in ROM. Based on this table, the range decision portion 31A decides the target range A1 corresponding to a contact operation range D.

As shown in FIG. 9, the range decision portion 31A performs adjustment of a decided target range A1 and re-decides a target range A2 after adjustment, similarly to the range decision portion 31.

Based on the hand and two fingers identified by the hand/finger identification portion 35, the processing menu display portion 32A causes display of the processing menu M at a position relative to the target range A1 associated with the combination of the hand and two fingers. For example, a plurality of conceivable patterns of combinations of a hand and two fingers are stored in advance in ROM, and a plurality of patterns of processing menu M display positions are stored in association with each of the combinations of a hand and two fingers. That is, a plurality of patterns of combinations of a hand and two fingers, and a plurality of patterns of processing menu M display positions, are stored in association as a table in ROM. Based on this table, the processing menu display portion 32A causes the processing menu M to be displayed at the display position associated with the combination of the identified hand and two fingers.

The processing decision portion 33 and processing execution portion 34 are similar to those of the first aspect, and so explanations are omitted.

Figure 11:
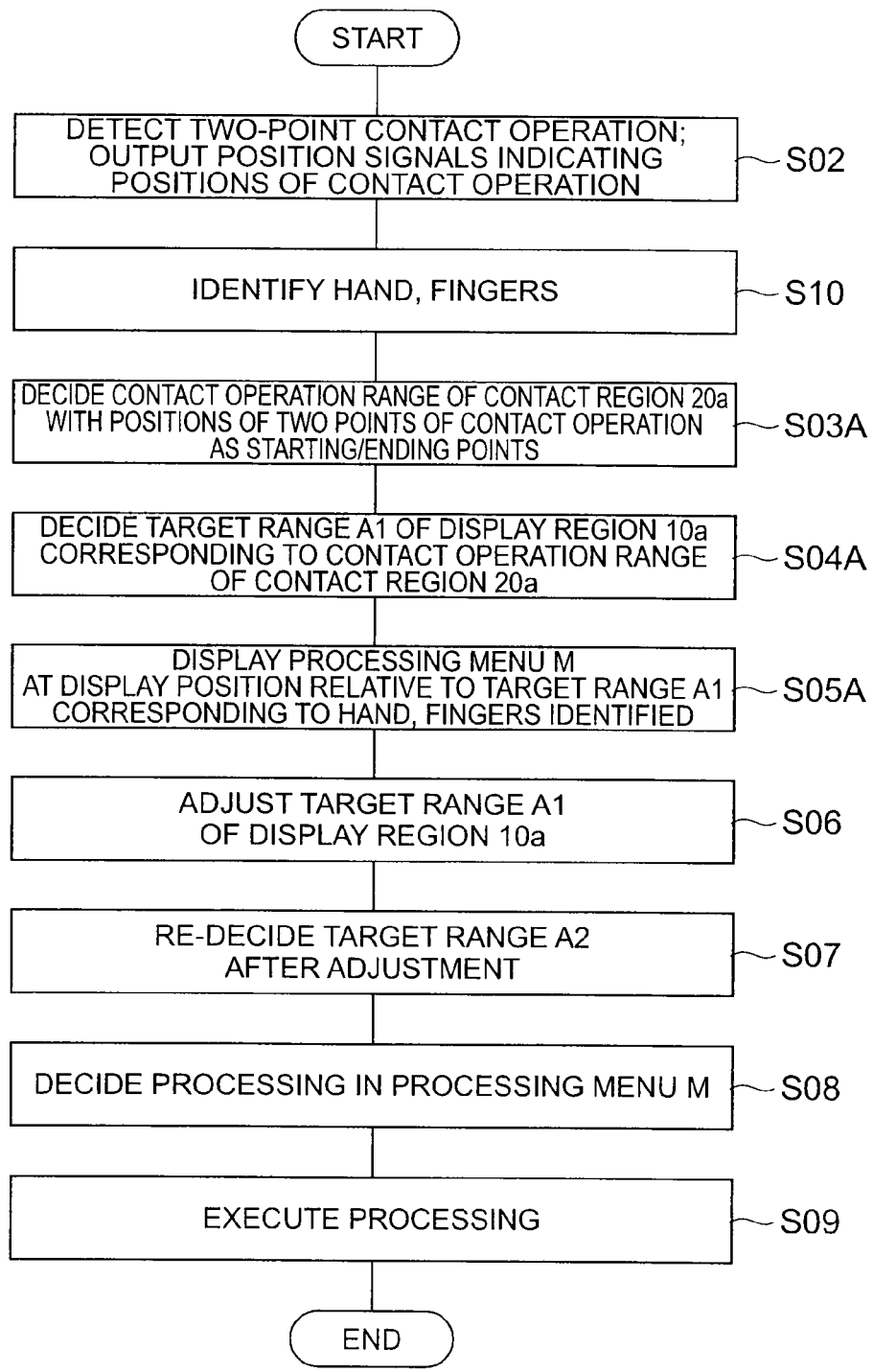
FIG. 11 is a flowchart showing the display information editing method of the information processing device of the second aspect of the invention.

Next, operation of the information processing device 1A of the second aspect is explained, and the display control method of the information processing device of the second aspect of the invention is explained. FIG. 11 is a flowchart showing the display control method of the information processing device of the second aspect of the invention.

First, as shown in FIG. 8, when the user touches the two points P2a, P2b with the thumb and little finger of the right hand, the processing of the above-described step S02 is performed. And, the image capture portion 40 captures an image of the user's hand and fingers, and outputs image signals to the control portion 30A. Then, by performing image processing of the image signals from the image capture portion 40, the hand/finger identification portion 35 identifies the hand and two fingers used in the contact operation (step S10).

Next, based on the position signals for the two points from the operation portion 20, the range decision portion 31A decides the contact operation range D of the contact region 20a having as starting and ending points the two positions P2a, P2b respectively of the contact operation (step S03A).

Next, based on the table stored in advance in ROM, the range decision portion 31A decides the target range A1 of the display region 10a corresponding to the contact operation range D of the contact region 20a (step S04A).

Next, as shown in FIG. 9, the processing menu display portion 32A causes the processing menu M to be displayed at the position relative to the target range A1 associated with the combination of the hand and two fingers identified by the hand/finger identification portion 35. In this aspect, the processing menu display portion 32A causes the processing menu M to be displaced in the center of the portion above the target range A1 corresponding to the combination of the thumb and little finger of the right hand (step S05A). Then, the processing of the above-described steps S06 to S09 is performed, and enlargement editing of the display image is performed, as shown in FIG. 10.

Similar advantages can be obtained from both the information processing device 1A of the second aspect and from the display control method of an information processing device of the second aspect as are obtained from the information processing device 1 of the first aspect and from the display control method of an information processing device of the first aspect.

Further, by means of the information processing device 1A of the second aspect and the display control method of an information processing device of the second aspect, the hand and two fingers used in range specification are identified by the hand/finger identification portion 35, so that when for example range specification has been performed using the little finger and thumb of the right hand, by displaying the processing menu in the center of the portion above the specified range, ease of operation by the index finger of the right hand can be improved. Hence ease of operation can be improved without depending on the hand and fingers used for contact operations. Further, the user can perform operations with one hand, so that ease of operation can be further improved.

This invention is not limited to the above-described aspects, and various modifications are possible. For example, in these aspects, examples of a portable telephone terminal as the information processing device were described; but the information processing device may be a PDA or a wide range of other devices capable of information processing.

Further, in this aspect, an example of image processing using a camera was described as an identification method for identifying the hand and two fingers of a contact operation; but the identification method is not limited to that of this aspect. For example, an identification method may be employed in which a pressure-sensitive sensor, touch sensor, or similar is used in identification using contact surface pressure.

Figure 12:
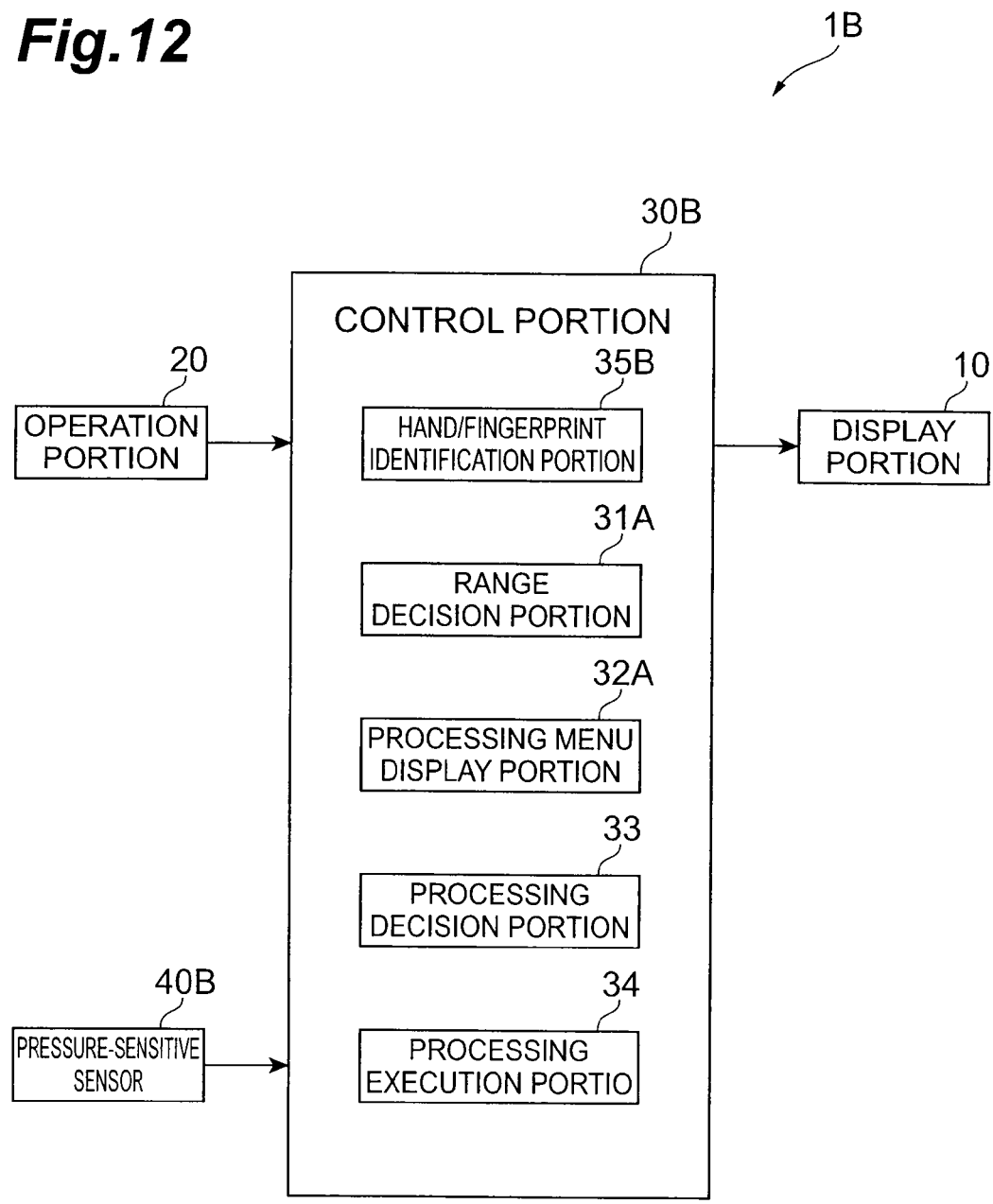
FIG. 12 is a block diagram showing the configuration of the information processing device of a modified example of the invention.
Figure 13:
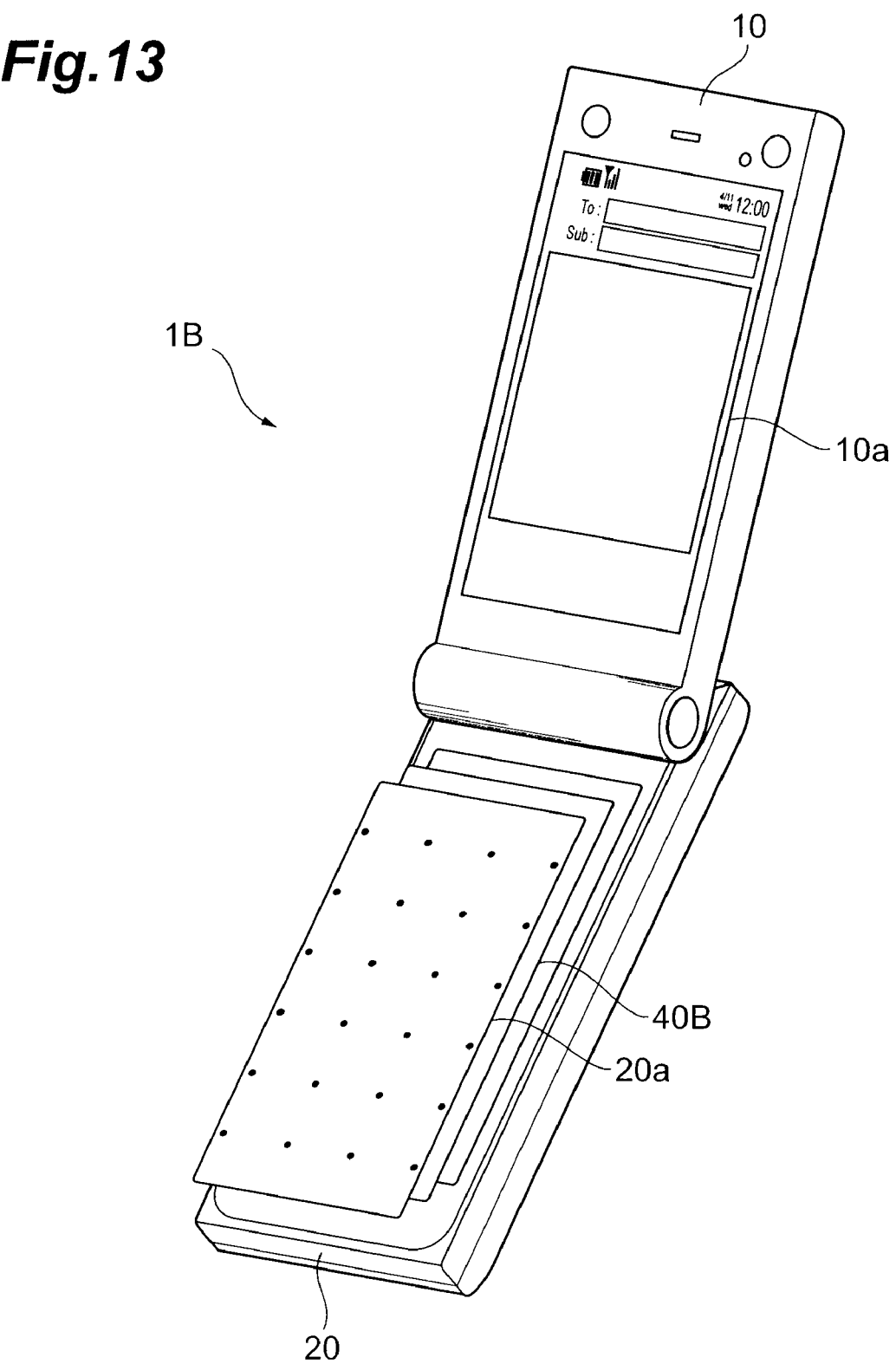
FIG. 13 is a perspective view showing, partially exploded, the configuration of the information processing device of a modified example of the invention.

FIG. 12 is a block diagram of an information processing device using a pressure sensor as a pressure-sensitive sensor; FIG. 13 is a perspective view showing, partially exploded, the configuration of the information processing device of FIG. 12. The configuration of the information processing device 1B of FIG. 12 and FIG. 13 differs from that of the information processing device 1A in that, in place of the image capture portion 40 and control portion 30A in the information processing device 1A, a pressure-sensitive sensor 40B and control portion 30B are comprised. For example, the pressure-sensitive sensor 40B is a sheet-shape pressure sensor, and as shown in FIG. 13, is arranged below the operation portion 20, that is, below the electrostatic pad. The pressure sensor detects pressure intensity of fingers of the user performing a contact operation through the electrostatic pad, and outputs the detected pressure intensity to the control portion 30B.

The control portion 30B differs from the control portion 30A in that, in place of the hand/finger identification portion 35 in the control portion 30A, a hand/finger identification portion 35B is comprised. The hand/finger identification portion 35B identifies whether the hand performing a contact operation is the right hand or the left hand, and further identifies the two fingers of a contact operation among the thumb, index finger, middle finger, ring finger, and little finger, from the pressure intensity from the pressure-sensitive sensor 40B, and through the contact area from the electrostatic sensor in the operation portion 20.

In general, the intensity of the force and the contact area of fingers performing contact operations are greater for the favored hand, right or left, and are larger in the order of the thumb, index finger, middle finger, ring finger, and little finger. Hence from the pressure intensity and contact area of the fingers of a contact operation, the hand and fingers of the contact operation can be identified. For example, a table which associates the pressure intensities and contact areas of the fingers of the right and left hands with the fingers of the hands is stored in advance in ROM, as shown in FIG. 14. Based on this table, the hand/finger identification portion 35B identifies the hand and fingers corresponding to the pressure intensities from the pressure-sensitive sensor 40B and the contact area from the electrostatic sensor in the operation portion 20 as the hand and fingers of a contact operation.

This table is for example registered in advance as follows. First, one finger at a time, in order, of the fingers on the right hand and left hand is brought into contact with the operation portion 20. Next, the five fingers of the right hand are brought into contact simultaneously with the operation portion 20, and the five fingers of the left hand are brought into contact simultaneously with the operation portion 20. Then, the five fingers of the right hand and the entire palm of the right hand are brought into contact simultaneously with the operation portion 20, and the five fingers and entire palm of the left hand are brought into contact simultaneously with the operation portion 20. For example, in each contact operation, two cases are performed which are the case of light touching and the case of forceful pressing; the average values of the pressure intensity and contact area in each contact operation for the case of light touching are taken to be minimum values and are registered in the table, associated with the respective fingers, and the average values of the pressure intensity and contact area in each contact operation for the case of forceful pressing are taken to be maximum values and are registered in the table, associated with the respective fingers. From these minimum values and maximum values, average values are determined, and in addition error correction values are determined, and the average values and error correction values are registered in the table, associated with the respective fingers.

When a specific user performs a contact operation using specific fingers, the table may for example be registered in advance as follows. First, only the fingers to be registered are brought into contact with the operation portion 20, one at a time and in order. Next, using a method of contact operation which is frequently performed by the specific user, the fingers to be registered are brought into contact simultaneously with the operation portion 20. For example, in each contact operation, two cases are performed which are the case of light touching and the case of forceful pressing; the average values of the pressure intensity and contact area in each contact operation for the case of light touching are taken to be minimum values and are registered in the table, associated with the respective fingers, and the average values of the pressure intensity and contact area in each contact operation for the case of forceful pressing are taken to be maximum values and are registered in the table, associated with the respective fingers. From these minimum values and maximum values, average values are determined, and in addition error correction values are determined, and the average values and error correction values are registered in the table, associated with the respective fingers.

According to FIG. 14, for example, when the contact area is for example 600 $mm^2$ or greater, the hand/finger identification portion 35B identifies the hand/finger of the contact operation as the palm of the hand; when the contact area is 150 $mm^2$ or less, the hand/finger identification portion 35B identifies the finger of the contact operation as the little finger. And, for other fingers, the hand/finger identification portion 35B identifies the finger of a contact operation from the average value of the contact area and the average value of the pressure intensity.

In a case in which the pressure intensity average value is the same for the right and left hands, the hand/finger identification portion 35B may take into consideration the structure of the fingers, and based on the position of the contact operation from the operation portion 20, may identify the right or left hand from the positional relationship of the contact operation. For example, as shown in (a) of FIG. 15, when there is a contact operation with a pressure intensity of 48 mm Hg above and to the left of the position of a contact operation with a pressure intensity of 55 mm Hg, the thumb and index finger of the left hand may be identified from the positional relationship, and when, as shown in (b) of FIG. 15, there is a contact operation with a pressure intensity of 48 mm Hg above and to the right of the position of a contact operation with a pressure intensity of 55 mm Hg, the index finger and middle finger of the right hand may be identified from the positional relationship. In order to enhance reliability, the hand/finger identification portion 35B may also identify left and right hands based on average values of contact area.

Figure 16:
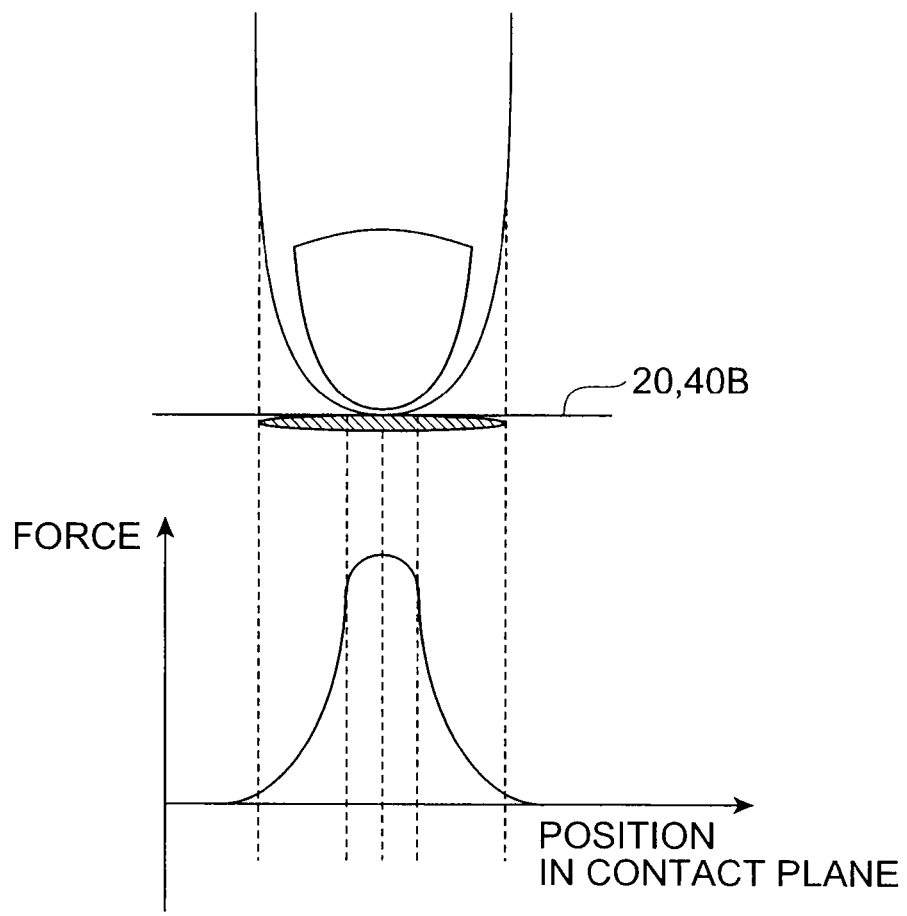
FIG. 16 shows the distribution of the contact area and pressure intensity of contact operations.

As shown in FIG. 16, the closer to the center of a finger which presses on the electrostatic pad and pressure sensor, the greater is the pressing force, so that by taking the position at which the pressing force is greatest to be the center, and plotting the range over which the pressing force is zero or greater, the contact area and the pressure intensity distribution can be ascertained.

Thereafter, based on the position signals for two points from the operation portion 20, the range decision portion 31A decides the contact operation range D of the contact region 20a having as starting and ending points the two positions P2a, P2b respectively of the contact operation, and then decides the target range A1 of the display region 10a corresponding to the contact operation range D of the contact region 20a. Next, based on the hand and two fingers identified by the hand/finger identification portion 35, the processing menu display portion 32A causes the processing menu M to be displayed at the position relative to the target range A1 associated with the combination of the hand and two fingers.

In this aspect and modified example, the processing menu display portion 32A causes the processing menu M to be displayed at the display position corresponding to the combination of identified fingers, based on a table stored in ROM in advance which associates a plurality of patterns of combinations of fingers with a plurality of patterns of display positions of the processing menu M; but the processing menu display portion 32A may assign priorities to the fingers, based on these priorities predict the optimum fingers to perform processing menu selection, and cause the processing menu M to be displayed. For example, based on priorities assigned in the order of thumb, index finger, middle finger, ring finger, little finger, the processing menu display portion 32A may predict that a finger other than the fingers of a contact operation, which exists at a position not overlapping with the contact operation range D of the contact region 20a, and which is the finger with the highest priority is the optimum finger for performing processing menu selection, and may cause the processing menu M to be displayed at a position in the display region 10a corresponding to the predicted position of this finger.

Figure 17:
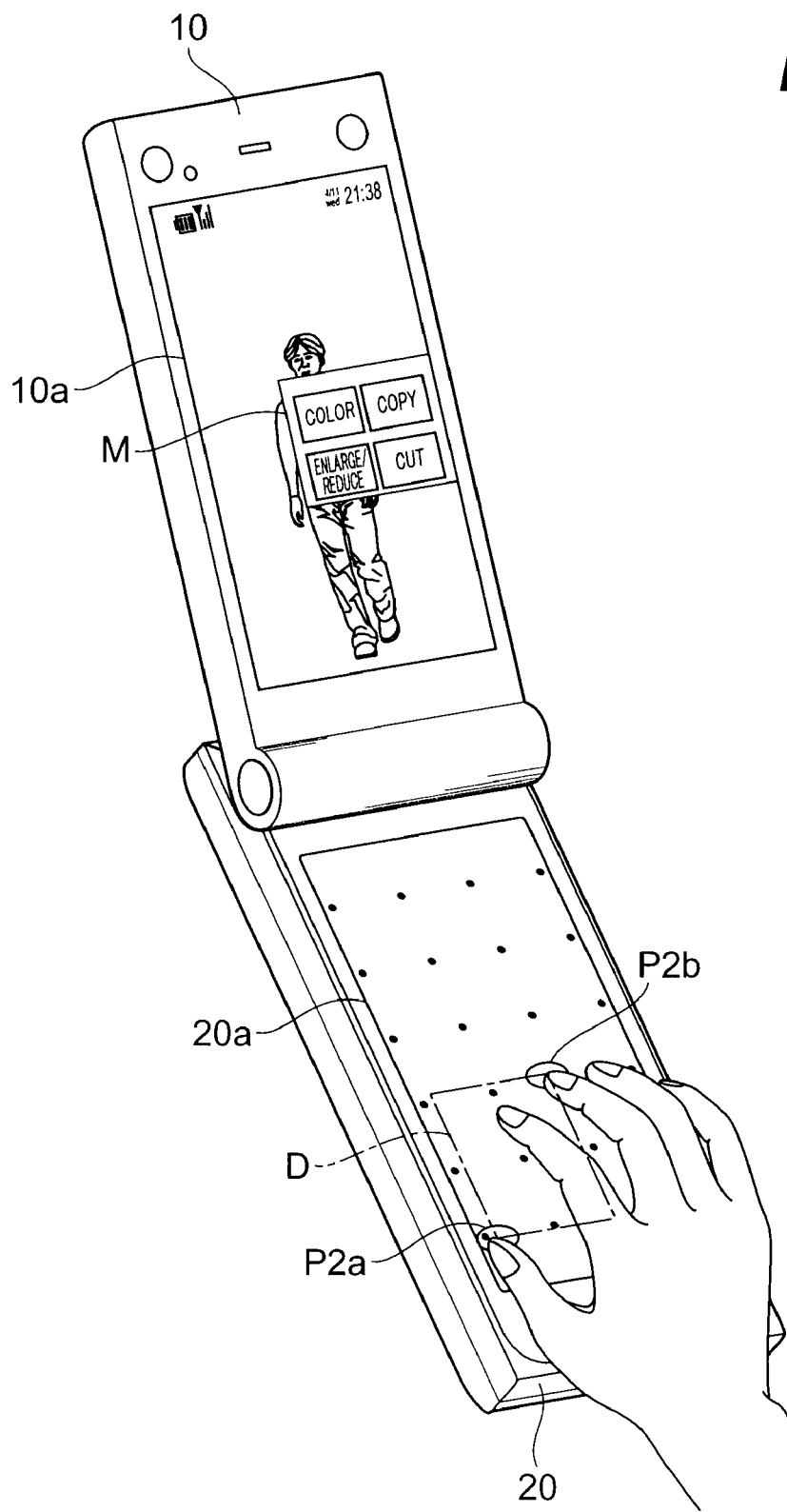
FIG. 17 shows an example of hand and finger identification processing and processing menu display processing in a modified example of the invention.
Figure 18:
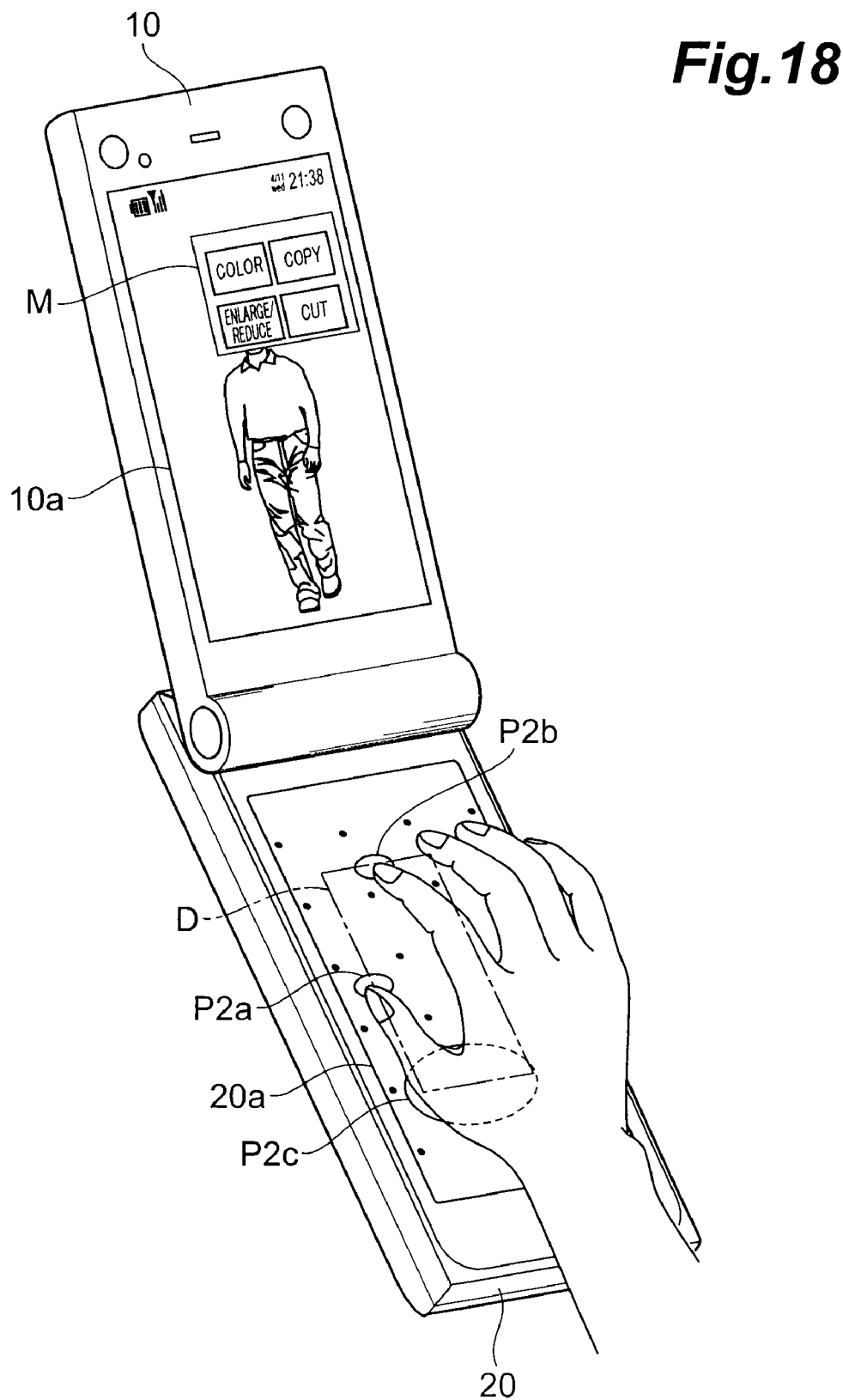
FIG. 18 shows an example of hand and finger identification processing and processing menu display processing in a modified example of the invention.

For example, when as shown in FIG. 17 the fingers at the two positions P2a and P2b of a contact operation are the thumb and middle finger of the right hand respectively, the index finger overlaps with the contact operation range D of the contact region 20a defined by the two positions P2a, P2b of the contact operation, so that the processing menu display portion 32A predicts that the optimum finger for performing processing menu selection is the ring finger, and causes the processing menu M to be displayed at the position of the display region 10a corresponding to the position of this ring finger. And, when as for example shown in FIG. 18 the fingers at the three positions P2a, P2b, P2c of a contact operation are respectively the thumb, index finger, and palm of the right hand, there are no fingers overlapping the contact operation range D of the contact region 20a defined by the three positions P2a, P2b, P2c of the contact operation, so that the processing menu display portion 32A predicts that the optimum finger to perform processing menu selection is the middle finger, and causes the processing menu M to be displayed at a position of the display region 10a corresponding to the position of this middle finger.

Figure 19:
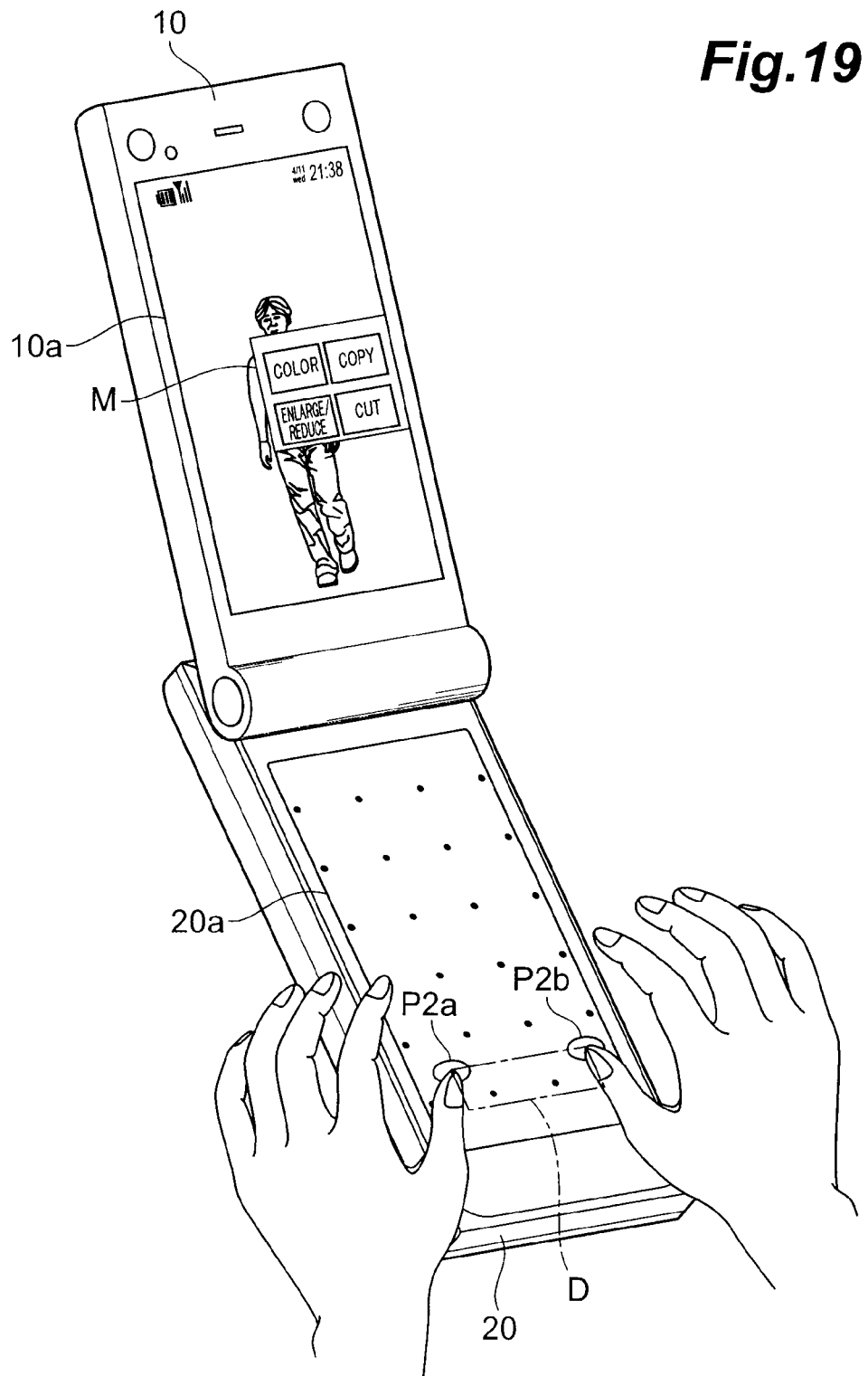
FIG. 19 shows an example of hand and finger identification processing and processing menu display processing in a modified example of the invention.

Here, when the fingers for use in a contact operation are the fingers of both hands, the processing menu display portion 32A may predict the optimum finger to perform processing menu selection based on further priorities in the order of the favored hand and the unfavored hand. For example, when the fingers of two positions P2a, P2b of a contact operation are the thumb of the left hand and the thumb of the right hand respectively, as shown in FIG. 19, the processing menu display portion 32A predicts that the optimum finger for performing processing menu selection is the index finger of the favored hand (for example, the right hand), and so causes the processing menu M to be displayed at the position of the display region 10a corresponding to the position of this index finger. At this time, the processing menu display portion 32A causes the processing menu M to be displayed at a position of the display region 10a corresponding to a position not overlapping with the contact operation range D of the contact region 20a.

Figure 20:
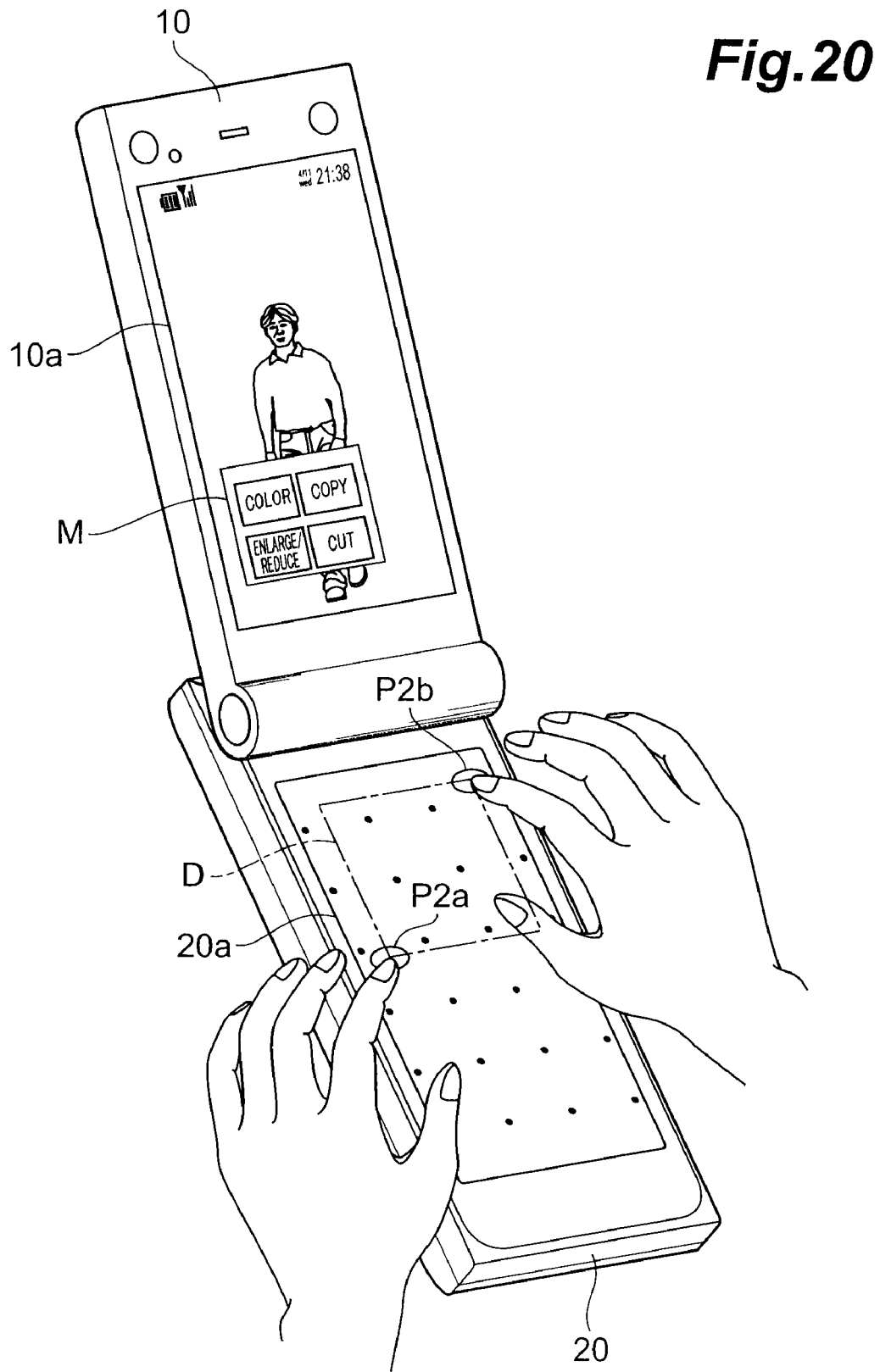
FIG. 20 shows an example of hand and finger identification processing and processing menu display processing in a modified example of the invention.

When the predicted optimum finger, that is, the finger other than a contact operation finger which is the finger on the favored hand with highest priority, overlaps with the contact operation range D, the finger other than the contact operation fingers with highest priority on the unfavored hand may be predicted to be the optimum finger for performing processing menu selection. For example, when as shown in FIG. 20 the fingers of the two positions P2a, P2b of a contact operation are respectively the index finger of the left hand and the index finger of the right hand, and the thumb of the favored hand (for example, the right hand) overlaps with the contact operation range D, the thumb of the unfavored hand (for example, the left hand) may be predicted to be the optimum finger for performing processing menu selection.

Figure 21:
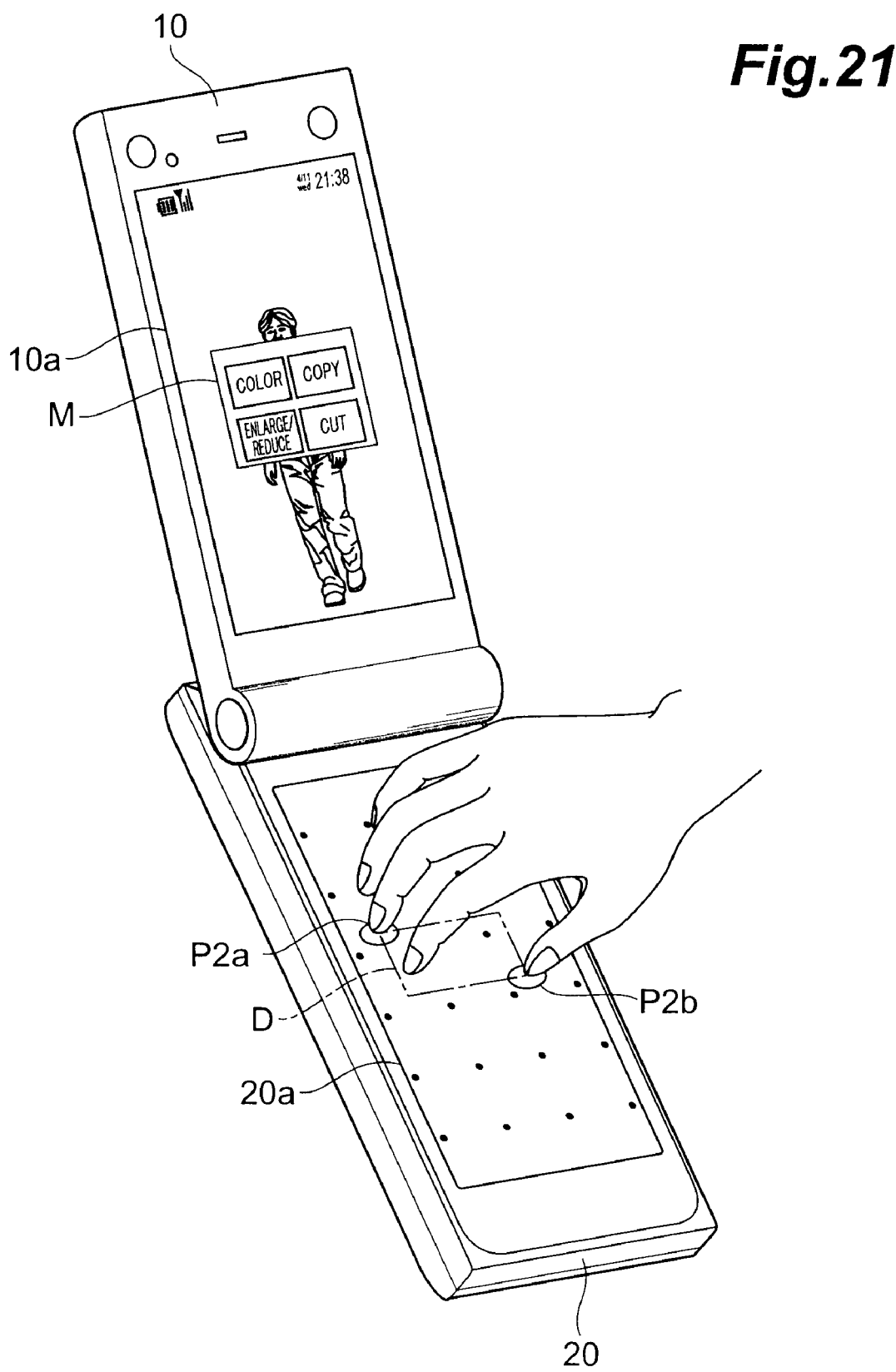
FIG. 21 shows an example of hand and finger identification processing and processing menu display processing in a modified example of the invention.
Figure 22:
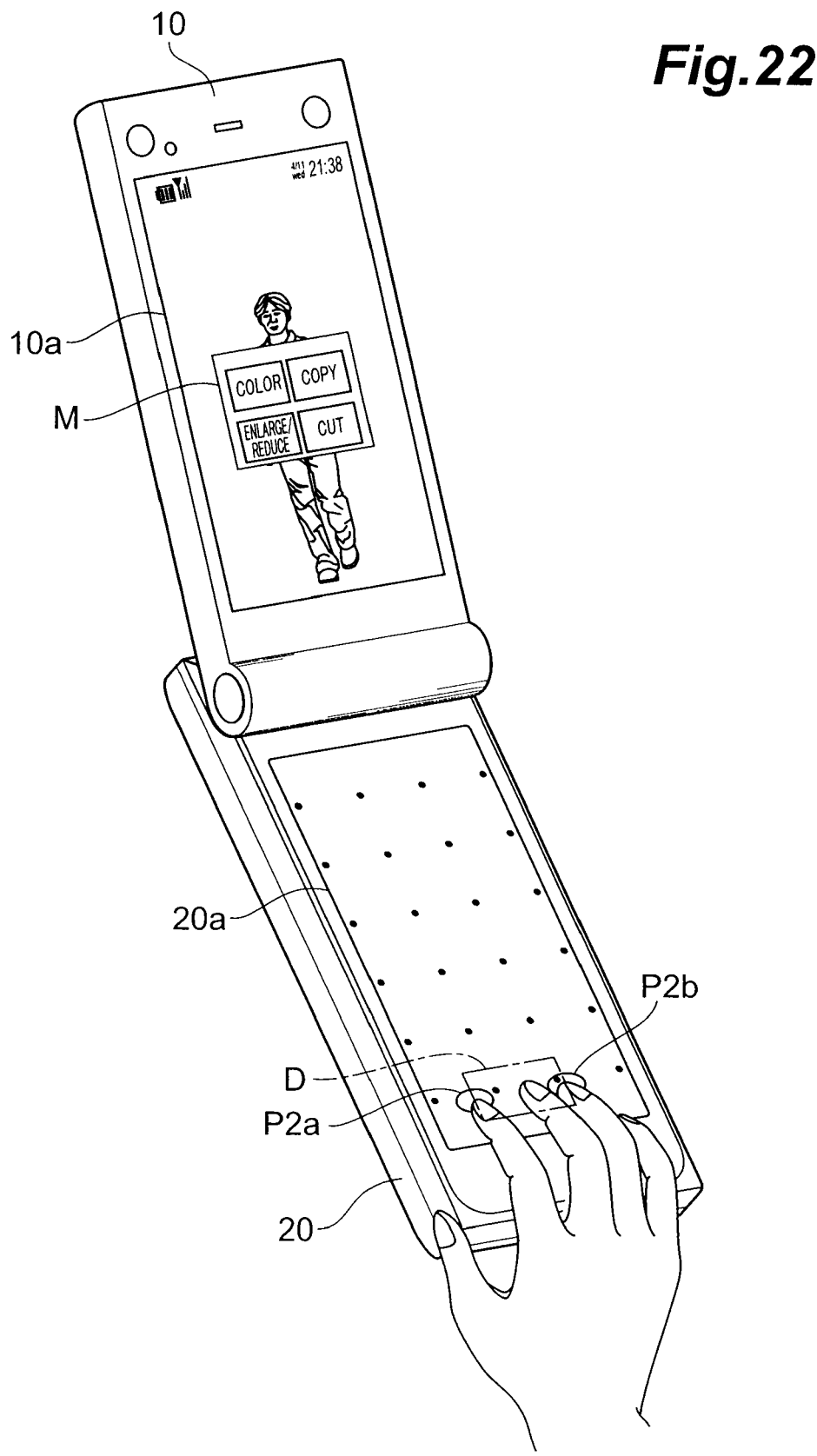
FIG. 22 shows an example of hand and finger identification processing and processing menu display processing in a modified example of the invention.

Further, the processing menu display portion 32A may predict the optimum finger to perform processing menu selection based on the positional relationship of the fingers of the contact operation and on the position of the contact operation range D of the contact region 20a, and may cause display of the processing menu M. For example, when as shown in FIG. 21 the fingers of the two positions P2a, P2b of a contact operation are the middle finger and thumb of the right hand respectively, and the positions P2a, P2b re near the center on the left side and near the center on the right side respectively, the processing menu display portion 32A predicts that the optimum finger for performing processing menu selection is the index finger, which is positioned between the position P2a (middle finger) and the position P2b (thumb), and causes the processing menu M to be displayed at the position of the display region 10a corresponding to the position of this index finger. At this time, the processing menu display portion 32A causes the processing menu M to be displayed at the position of the display region 10a corresponding to a position which does not overlap with the contact operation range D of the contact region 20a. Also, when for example as shown in FIG. 22 the fingers of two positions P2a, P2b of a contact operation are the index finger and the ring finger of the right hand respectively, and the positions P2a, P2b are respectively in the lower left and lower right, the processing menu display portion 32A predicts that the optimum finger for performing processing menu selection is the middle finger, positioned between the position P2a (index finger) and the position P2b (ring finger), and causes the processing menu M to be displayed at the position of the display region 10a corresponding to the position of this middle finger. At this time, the processing menu display portion 32A causes the processing menu M to be displayed at the position of the display region 10a corresponding to a position which does not overlap with the contact operation range D of the contact region 20a.

Figure 23:
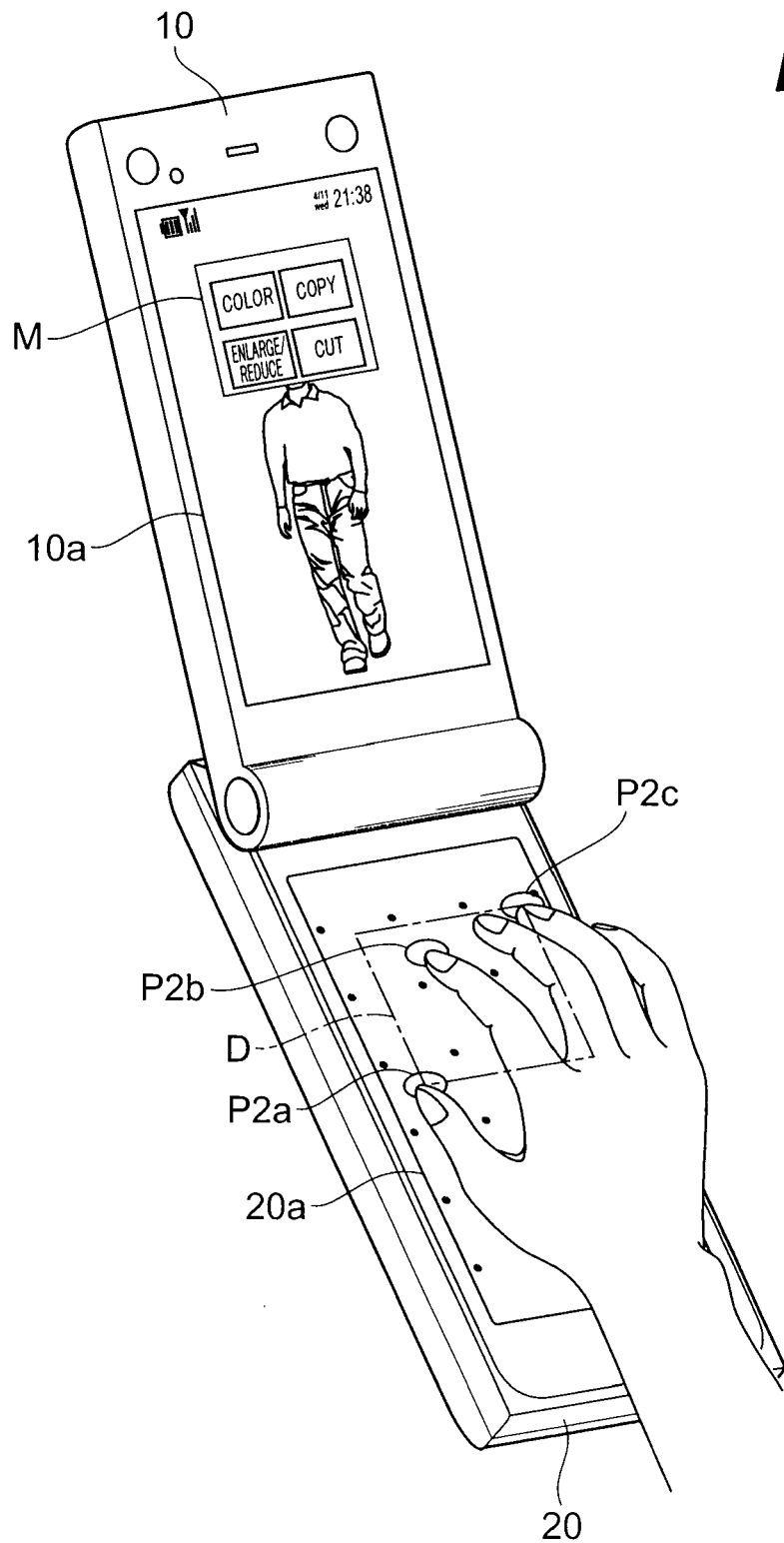
FIG. 23 shows an example of hand and finger identification processing and processing menu display processing in a modified example of the invention.

Here, when there are three or more contact operation fingers, so that for example as shown in FIG. 23 the fingers in three positions P2a, P2b, P2c of a contact operation are respectively the thumb, index finger, and ring finger of the right hand, and the positions P2a, P2b, P2c are respectively in the center-left, upper left, and upper right, the processing menu display portion 32A predicts that the optimum finger for performing processing menu selection is the middle finger, positioned between the position P2b (index finger) and the position P2c (ring finger), and causes the processing menu M to be displayed at the position of the display region 10a corresponding to the position of this middle finger. At this time, the processing menu display portion 32A causes the processing menu M to be displayed at the position of the display region 10a corresponding to a position which does not overlap with the contact operation range D of the contact region 20a.

Thus in this modified example, by using an electrostatic sensor as the operation portion 20 and detecting the contact areas, and using a pressure sensor as a pressure-sensitive sensor 40B and detecting pressure intensities, the optimum finger for performing processing menu selection is predicted, and the processing menu M can be displayed at the optimum position, so that ease of operation by the user can be further improved.

Figure 24:
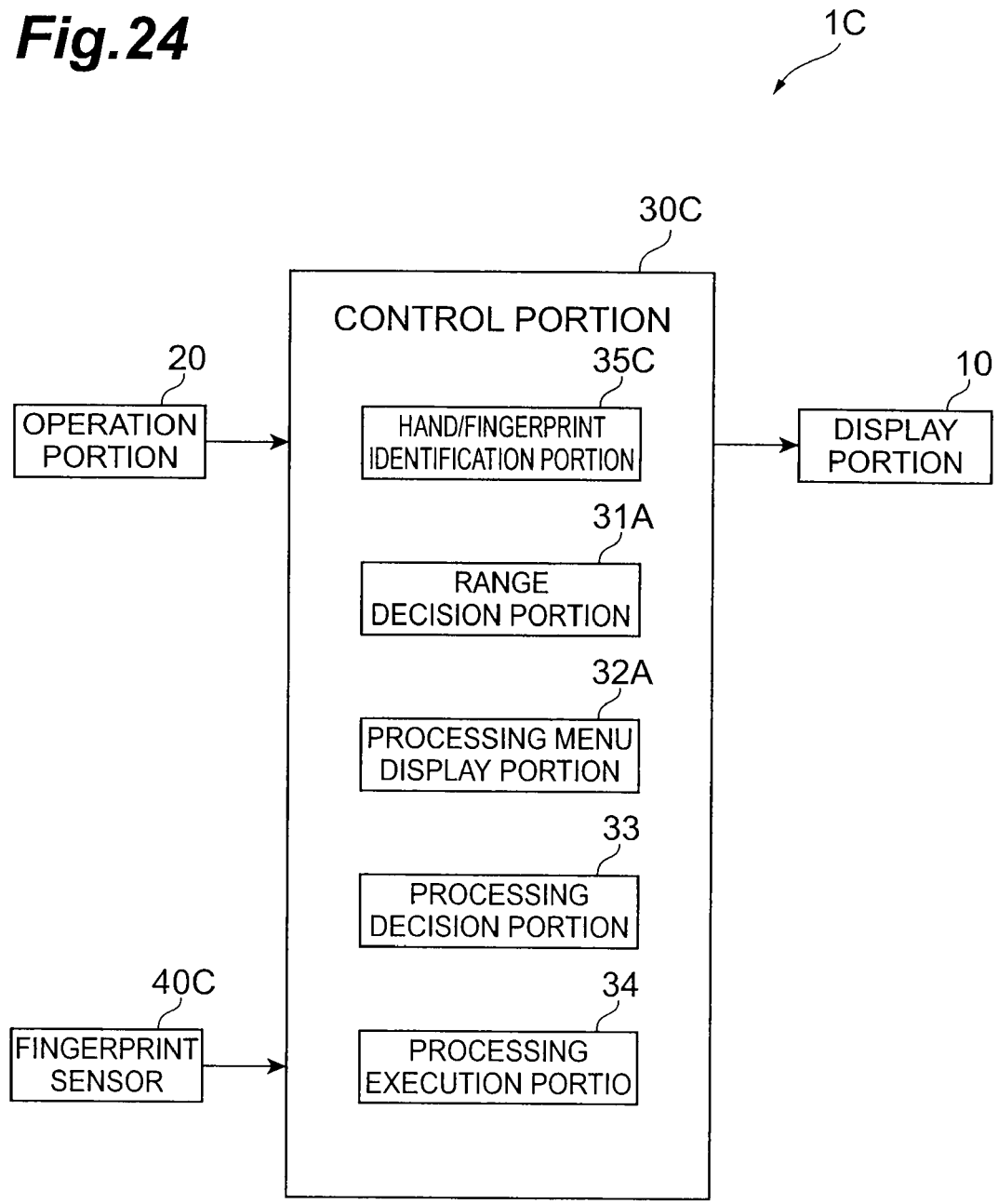
FIG. 24 is a block diagram showing the configuration of the information processing device of a modified example of the invention.
Figure 25:
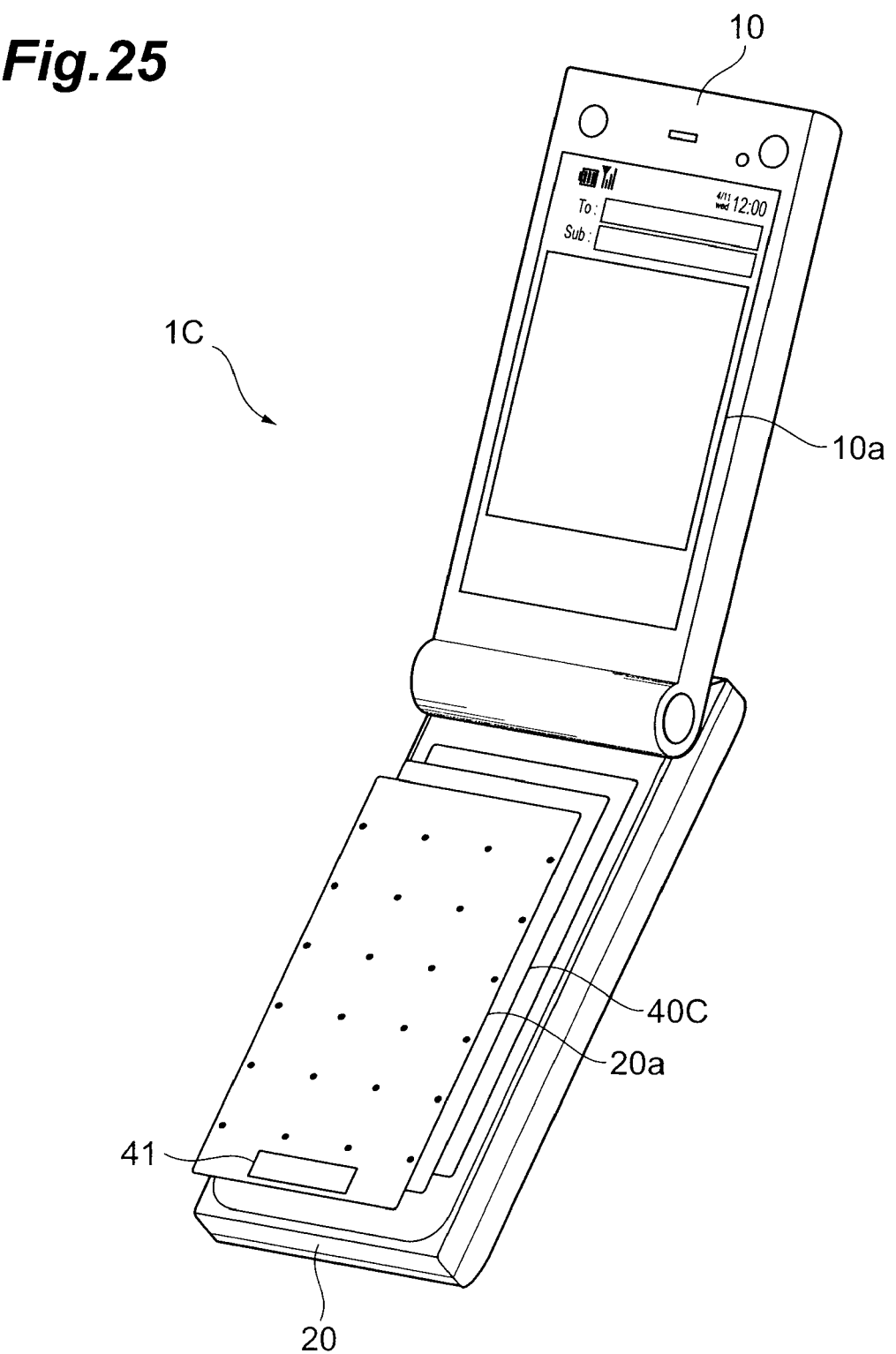
FIG. 25 is a perspective view showing, partially exploded, the configuration of the information processing device of a modified example of the invention.

In this modified example, an identification method which performed identification using a fingerprint sensor or similar may be applied as the identification method for identifying the hand and two fingers of a contact operation. FIG. 24 is a block diagram of an information processing device employing a fingerprint sensor, and FIG. 25 is a perspective view showing the configuration of the information processing device shown in FIG. 24. As shown in FIG. 24 and FIG. 25, the information processing device 1C comprises a fingerprint sensor 40C and control portion 30C in place of the pressure-sensitive sensor 40B and control portion 30B in the information processing device 1B. For example, the fingerprint sensor 40C is a sheet-shape fingerprint sensor, and as shown in FIG. 25, is arranged below the operation portion 20, that is, below the electrostatic pad. The fingerprint sensor detects the fingerprints of the fingers of the user performing contact operations through the electrostatic pad, and outputs the detected fingerprints to the control portion 30C.

The control portion 30C differs from the control portion 30B in comprising a hand/finger identification portion 35C in place of the hand/finger identification portion 35B in the control portion 30B. The hand/finger identification portion 35C identifies the hand of a contact operation as the right hand or left hand through fingerprints from the fingerprint sensor 40C, and identifies the two fingers of the contact operation among the thumb, index finger, middle finger, ring finger, and little finger. For example, a table which associates the fingerprints of the fingers of the right and left hands with the fingers is stored in advance in ROM. The hand/finger identification portion 35C identifies the finger corresponding to a fingerprint from the fingerprint sensor 40C as the finger of a contact operation based on this table. This table may for example be stored in advance by making measurements using a fingerprint sensor 41.

In this aspect, the display size and position of the processing menu are fixed; however, through dragging operations using the user's fingers or similar, the display size of the processing menu may be made modifiable, or it may be possible to move the processing menu.

Further, in these aspects the range decision processing to decide the target range is performed by the range decision portions 31 and 31A independently of the timing of contact operations for the two points; but the target range may be decided only when the range decision portions 31, 31A receive the position signals for two points from the operation portion 20 simultaneously, that is, when the two-point contact operation is performed simultaneously. By this means, for example, an information input operation performed by single-point contact, and a range specification operation performed by two-point simultaneous contact, can be discriminated, so that even during information input operations, display information editing processing can be caused to be performed.

In these aspects, an electrostatic pad was described as an example of the operation portion 20; but a touch panel, optical sensors, or a wide variety of other devices capable of detecting contact operations can be employed as the operation portion 20.

What is claimed is:
1. An information processing device, comprising:
    display means for displaying information;
    operation means, having a contact region corresponding to a display region of the display means, for detecting a contact operation in the contact region and outputting a position signal indicating the position of the contact operation in the contact region;
    range decision means for deciding a target range of the display region, based on the position signals for two points from the operation means;
    processing menu display means for causing a processing menu to appear on the display means at a position corresponding to the target range of the display region decided by the range decision means, the processing menu receiving selection of various processing;
    processing decision means for deciding processing of the processing menu corresponding to the position of the contact operation in the contact region, based on the position signal for a third point from the operation means; and
    processing execution means for executing the processing decided by the processing decision means on the target range of the display region decided by the range decision means.

2. The information processing device according to claim 1, wherein the processing menu display means causes the display means to display the processing menu at a position set in advance for the target range of the display region.

3. The information processing device according to claim 1, further comprising identification means for identifying whether a hand performing the contact operation in the contact region is the right hand or the left hand, and for identifying two fingers of the contact operation, wherein the processing menu display means causes the display means to display the processing menu at a position relative to the target range of the display region associated with the combination of the hand and the two fingers, based on the hand and the two fingers identified by the identification means.

4. The information processing device according to claim 3, further comprising:
    an identification table including a plurality of gestures and used by the identification means for identifying for identifying the hand performing the contact.

5. The information processing device according to claim 1, wherein, when the position of the contact operation indicated by the position signals for two points from the operation means changes, the range decision means re-decides the target range of the display region.

6. The information processing device according to claim 1, wherein the range decision means decides the target range of the display region only when the position signals for two points are received simultaneously from the operation means.

7. The information processing device according to claim 1, wherein the contact region is separate from the display region.

8. A display information editing method of an information processing device which has display means for displaying information and operation means having a contact region corresponding to a display region of the display means, comprising the steps of:
    detecting a contact operation in the contact region, and generating a position signal indicating the position of the contact operation in the contact region;
    deciding a target range of the display region based on the position signals for two points;
    causing a processing menu to appear on the display means at a position corresponding to the decided target range of the display region, the processing menu receiving selection of various processing;
    deciding processing of the processing menu corresponding to the position of the contact operation in the contact region, based on the position signal for a third point; and
    executing the decided processing on the decided target range of the display region.

9. An information processing device, comprising:
    a display to display information;
    an operation unit, having a contact region for interacting with a display region of the display, to detect a contact operation in the contact region and outputting a position signal indicating the position of the contact operation in the contact region;
    range decision unit to determine a target range of the display region, based on the position signals for two points from the operation unit;

processing menu display unit to cause a processing menu to appear on the display, at a position corresponding to the target range of the display region decided by the range decision unit, the processing menu receiving selection of various processing;

processing decision unit to determine processing of the processing menu corresponding to the position of the contact operation in the contact region, based on the position signal for a third point from the operation unit; and processing execution unit to execute the processing decided by the processing decision unit on the target range of the display region decided by the range decision unit.

10. An information processing device, comprising:

display means for displaying information;

operation means, having a contact region corresponding to a display region of the display means, for detecting a contact operation in the contact region and outputting a position signal indicating the position of the contact operation in the contact region;

range decision means for deciding a target range of the display region, based on the position signals for two points from the operation means;

processing menu display means for causing the display means to display a processing menu for selection of various processing, at a position corresponding to the target range of the display region decided by the range decision means;

processing decision means for deciding processing of the processing menu corresponding to the position of the contact operation in the contact region, based on the position signal for a third point from the operation means; and processing execution means for executing the processing decided by the processing decision means on the target range of the display region decided by the range decision means, wherein the range decision means decides the target range of the display region, based on the position signals for the two points from the operation means and based upon a table associating coordinates of the contact region to coordinates of the display region.

11. The information processing device according to claim 10, wherein the processing menu is displayed in a lower right portion of the target range.

* * * * *